United States Patent
Chao et al.

(10) Patent No.: US 11,988,381 B2
(45) Date of Patent: May 21, 2024

(54) CATALYTIC THERMAL DEBIND FURNACES WITH FEEDBACK CONTROL

(71) Applicant: Markforged, Inc., Watertown, MA (US)

(72) Inventors: Michelle Chao, Somerville, MA (US); Keith Durand, Watertown, MA (US); Rick Bryan Woodruff, Watertown, MA (US); Benjamin Hodsdon Gallup, Watertown, MA (US)

(73) Assignee: Markforged, Inc., Watertown, MA (US)

(*) Notice: Subject to any disclaimer, the term of this patent is extended or adjusted under 35 U.S.C. 154(b) by 356 days.

(21) Appl. No.: 16/897,529

(22) Filed: Jun. 10, 2020

(65) Prior Publication Data

US 2020/0393126 A1 Dec. 17, 2020

Related U.S. Application Data

(60) Provisional application No. 62/860,545, filed on Jun. 12, 2019.

(51) Int. Cl.

| | |
|---|---|
| *F23G 7/06* | (2006.01) |
| *B22F 3/00* | (2021.01) |
| *F23G 7/07* | (2006.01) |
| *F27B 5/14* | (2006.01) |
| *F27B 5/18* | (2006.01) |
| *F27D 17/00* | (2006.01) |

(Continued)

(52) U.S. Cl.
CPC .............. *F23G 7/065* (2013.01); *B22F 3/003* (2013.01); *F23G 7/07* (2013.01); *F27B 5/14* (2013.01); *F27B 5/18* (2013.01); *F27D 17/008* (2013.01); *F23G 2207/10* (2013.01); *F23G 2207/101* (2013.01); *F23G 2207/30* (2013.01); *F23G 2209/14* (2013.01); *F27B 2005/068* (2013.01); *F27B 2005/161* (2013.01); *F27D 2009/0037* (2013.01); *F27D 2019/0015* (2013.01); *F27D 2019/0018* (2013.01); *F27D 2019/0068* (2013.01)

(58) Field of Classification Search
None
See application file for complete search history.

(56) References Cited

U.S. PATENT DOCUMENTS

| | | | | |
|---|---|---|---|---|
| 4,179,263 A | * | 12/1979 | Jung | B09C 1/06 588/257 |
| 2008/0280244 A1 | * | 11/2008 | Miyata | F27D 17/00 432/72 |
| 2010/0062381 A1 | * | 3/2010 | Gross | F23N 5/00 431/12 |

FOREIGN PATENT DOCUMENTS

| | | | |
|---|---|---|---|
| CN | 204247220 U | * | 4/2015 |
| JP | H10267248 A | * | 10/1998 |

* cited by examiner

*Primary Examiner* — Jason Lau
(74) *Attorney, Agent, or Firm* — Weiss & Arons LLP

(57) ABSTRACT

Apparatus and methods for debinding articles. The apparatus and methods may transform binder from furnace exhaust before the exhaust is discharged to the atmosphere. The apparatus may include a furnace retort and a reactor. The furnace retort may be configured to: exclude ambient air; and receive a carrier gas. The reactor may be configured to: receive from the retort (a) the carrier gas and (b) material removed in the retort from the article; and combust, at a temperature no greater than 750° C., the material. The material may be decomposed binder. The material may be hydrocarbon from binder that is pyrolyzed in the retort. The carrier gas may include gas that is nonflammable gas.

8 Claims, 14 Drawing Sheets

(51) Int. Cl.
*F27B 5/06* (2006.01)
*F27B 5/16* (2006.01)
*F27D 9/00* (2006.01)
*F27D 19/00* (2006.01)

CATALYTIC THERMAL DEBIND FURNACES WITH FEEDBACK CONTROL

CROSS-REFERENCE TO RELATED APPLICATION

This application claims the benefit of U.S. Provisional Patent Application No. 62/860,545, filed on Jun. 12, 2019, entitled, "CATALYTIC THERMAL DEBIND FURNACES WITH FEEDBACK CONTROL" which is hereby incorporated by reference herein in its entirety.

BACKGROUND

A sintering furnace is typically used to process articles formed from a structural component, such as metal polymer or ceramic and a binder component. The structural component may be a powder. The binder may be mixed with the powder to form a compact that may be formed. The articles are typically formed using techniques such as Fused Deposition Modeling, Fused Filament Fabrication, Metal Injection Molding and Binder Jetting. After production, the article typically includes the structural component and two binders. The article then may be referred to as a "green part" or a "green body." The first binder is typically chemically or thermally removed. The article then may be referred to as a "brown part" or a "brown body." The brown part is then heated in the sintering furnace to remove the second binder, which is typically plastic, and densify the article.

The sintering furnace includes a chamber in which the article is placed. The sintering furnace typically is programmed to execute a temperature "ramp" that has two heating phases: a thermal debinding phase to remove the second binder and a sintering phase. The sintering furnace may be programmed to execute a temperature "ramp" that has three heating phases: a thermal debinding phase to remove the first binder, a thermal debinding phase to remove the second binder and a sintering phase.

The second binder holds the part's shape in the sintering furnace until sufficient necking occurs between particles of the structural material to support itself against gravity. The second binder may be composed of polymers such as polyethylene or polypropylene which thermally decompose at temperatures between 250° C. and 475° C. into shorter chain hydrocarbons such as methane and other waste pyrolysis products. The pyrolysis products exhibit a range of molecular weights.

A furnace assembly typically removes, traps, or eliminates these waste byproducts within the assembly (either within the furnace itself or within an accessory) before the assembly releases the exhaust to an indoor or outdoor atmosphere.

The volatility of lower molecular weight materials in exhaust may make them difficult to capture, and higher molecular weight products can collect in downstream components of the furnace, possibly creating flow restrictions or clogs.

A furnace assembly for sintering typically treats furnace effluent using fiber-type filters. The filters become saturated after a small number of uses. After saturation, a filter must be cleaned or replaced. Failure to regularly replace filters, or completing a furnace run with an unusually large loading can lead to furnace gas flow obstruction, aborted runs, or damaged or defective sintered products.

Some assemblies that use flammable carrier gas combust exhaust gas using a burn-off tower to handle the exhaust gas. Some assemblies use cold traps to condense and capture combustion products.

An assembly typically processes a small mass of brown parts, so filters are not overly burdensome. However, as additive manufacturing develops, throughput will increase, and filters may not have the efficacy to keep up with throughput.

It would therefore be desirable to provide apparatus and methods for processing articles at different levels of throughput.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
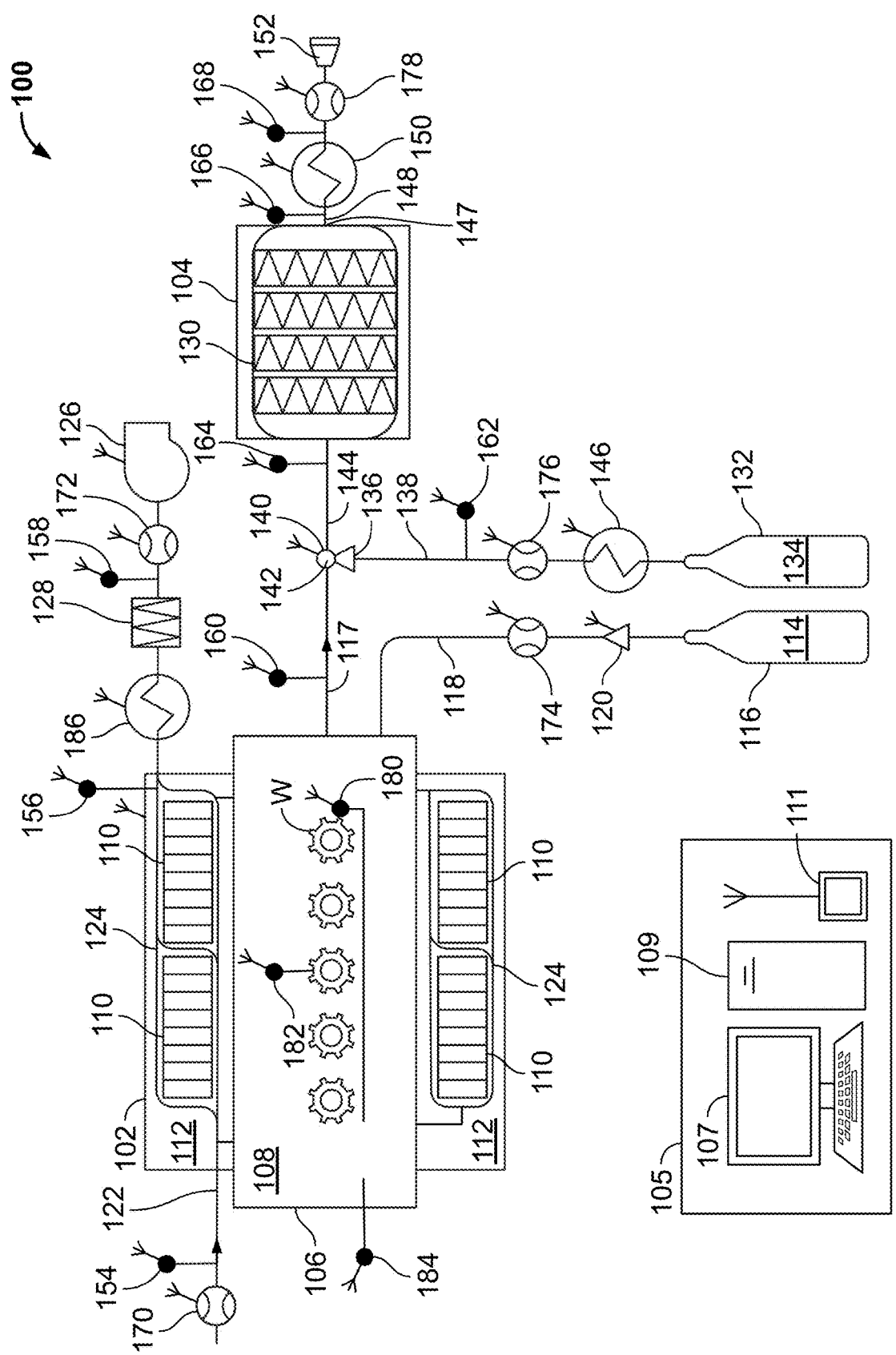
FIG. 1 shows illustrative apparatus in accordance with principles of the invention.

Apparatus and methods for debinding articles are provided. The apparatus and methods may transform binder from furnace exhaust before the exhaust is discharged to the atmosphere.

The apparatus may include, and the methods may involve, apparatus for processing an article. The article may include a "brown part" that includes structural material and binder. The apparatus may include a furnace retort and a reactor. The furnace retort may be configured to: exclude ambient air; and receive a carrier gas. The reactor may be configured to: receive from the retort (a) the carrier gas and (b) material removed in the retort from the article; and combust, at a temperature no greater than 750° C., the material. The material may be decomposed binder. The material may be hydrocarbon from binder that is pyrolyzed in the retort.

Table 1 lists illustrative structural material.

TABLE 1

Illustrative structural material.
Illustrative structural material

Alloy
Aluminum
Bronze
Carbon fiber
Carbon nanotube
Composite
Gold
Graphene
Metal
Nickel
Illustrative structural material
Nickel-titanium alloy ("Nitinol")
Stainless steel
Steel
Titanium
Copper
Ceramic
Alumina
Zirconia
Silica
Other suitable structural materials Table 2 lists illustrative binder.

TABLE 2

Illustrative binder.
Illustrative binder

Acrylonitrile Butadiene Styrene
Polyamide
Polycarbonate
Polyethylene
Polypropylene
PVA
PBA
PMMA
PEO
Copolymer and terpolymers thereof
Gums
Other suitable binders The carrier gas may include gas that is nonflammable gas. The carrier gas may include flammable gas. The carrier gas may include a mixture of non-flammable and flammable gases. The mixture may include sufficient flammable gas to be flammable. The mixture may include a concentration of flammable gas at which the mixture is non-flammable. The terms "flammable" and "non-flammable," as used herein, refer to behavior of a material when the material is at standard temperature and pressure.

Table 3 lists illustrative ranges of carrier gas flammable and non-flammable constituents.

TABLE 3

Illustrative ranges of carrier gas flammable and non-flammable constituents. Illustrative ranges (mol-percent)

| Flammable | | Non-flammable | |
|---|---|---|---|
| Lower | Upper | Upper | Lower |
| 0 | 1 | 100 | 99 |
| 1 | 2 | 99 | 98 |
| 2 | 3 | 98 | 97 |

TABLE 3-continued

Illustrative ranges of carrier gas flammable and non-flammable constituents. Illustrative ranges (mol-percent)

| Flammable | | Non-flammable | |
|---|---|---|---|
| Lower | Upper | Upper | Lower |
| 3 | 4 | 97 | 96 |
| 4 | 5 | 96 | 95 |
| 5 | 6 | 95 | 94 |
| 6 | 7 | 94 | 93 |
| 7 | 8 | 93 | 92 |
| 8 | 9 | 92 | 91 |
| 9 | 10 | 91 | 90 |
| 10 | 12 | 90 | 88 |
| 12 | 14 | 88 | 86 |
| 14 | 16 | 86 | 84 |
| 16 | 18 | 84 | 82 |
| 18 | 20 | 82 | 80 |
| 20 | 25 | 80 | 75 |
| 25 | 30 | 75 | 70 |
| 30 | 35 | 70 | 65 |
| 35 | 40 | 65 | 60 |
| 40 | 45 | 60 | 55 |
| 45 | 50 | 55 | 50 |
| 50 | 60 | 50 | 40 |
| 60 | 70 | 40 | 30 |
| 70 | 80 | 30 | 20 |
| 80 | 90 | 20 | 10 |
| 90 | 99 | 10 | 1 |
| Other suitable lower limits | Other suitable upper limits | Other suitable upper limits | Other suitable upper limits |

Table 4 lists illustrative carrier gases.

TABLE 4

Illustrative carrier gases.
Illustrative carrier gases

Helium (non-flammable)
Nitrogen (non-flammable)
Argon (non-flammable)
Hydrogen (flammable)
Illustrative carrier gases
Fluorinated gas (e.g., hydrofluorocarbon) (non-flammable)
Other suitable carrier gases
Mixtures of two or more of the gases listed above Table 5 lists illustrative combustion temperature range limits for a range of 25° C. The range may be 10, 20, 30, 40, and 50° C., or any other suitable range.

TABLE 5

Illustrative combustion temperature range limits.
Illustrative combustion temperature range limits

| Lower (° C.) | Upper (° C.) |
|---|---|
| 200 | 225 |
| 225 | 250 |
| 250 | 275 |
| 275 | 300 |
| 300 | 325 |
| 325 | 350 |
| 350 | 375 |
| 375 | 400 |
| 400 | 425 |
| 425 | 450 |
| 450 | 475 |
| 475 | 500 |
| 500 | 525 |
| 525 | 550 |

TABLE 5-continued

Illustrative combustion temperature range limits.
Illustrative combustion temperature range limits

| Lower (° C.) | Upper (° C.) |
|---|---|
| 550 | 575 |
| 575 | 600 |
| 600 | 625 |
| 625 | 650 |
| 650 | 675 |
| 675 | 700 |
| 700 | 725 |
| 725 | 750 |
| 750 | 775 |
| 775 | 800 |
| Other suitable lower limits | Other suitable upper limits |

The retort may be disposed in a furnace assembly. The assembly may house one or more of the retort, heating elements, cooling elements, insulating material, and any other suitable components. The furnace may be provided with a process controller. The process controller may receive user inputs that define a temperature ramp that defines temperature set-points corresponding to different times in a "run."

The furnace may be a furnace whose inputs do not include quantitative information about batch mass or binder mass for the run.

The furnace may be a furnace whose inputs include information about batch mass or binder mass for the run. The information may be qualitative. The information may be quantitative. Table 6 lists illustrative quantitative batch input information.

TABLE 6

Illustrative batch input information.
Illustrative batch input information

Batch mass
Article mass
Number of articles per batch sub-set
Article mass for a selected batch sub-set
Weight percent binder for a batch or a batch sub-set
Structural material specific heat
Structural material thermal conductivity
Article effective thermal conductivity
Binder pyrolysis products decomposition temperatures
Binder molecular weight
Article structural material
Binder material
Article surface area
Article volume
Article density
Carrier gas composition The process controller may map one or more inputs to one or more furnace schedules. The mapping may be preprogrammed. The schedules may be stored in machine memory. For example, the process controller may map inputs to schedules as follows: Batch weight of 1-5 kg: use Schedule A; Batch weight of 5-8 kg use Schedule B; Batch weight of 8-10 kg: use Schedule C. Schedule C may ramp more slowly than does Schedule B. Schedule B may ramp more slowly than does Schedule A.

The process controller may refer to a lookup table. The lookup table may list corresponding input-ramp rate pairs. The lookup table may list corresponding input-furnace schedule pairs. The process controller may interpolate between values in the lookup table. The lookup table may include historical sintering inputs and furnace schedules. The lookup table may include historical sintering inputs and ramp rates. The lookup table may include values that are interpolated between the historical sintering inputs and furnace schedules. The lookup table may include values that are interpolated between the historical sintering inputs and ramp rates. For example, the processor may assign to a 7 kg input a new schedule that is interpolated between Schedule A and Schedule B. The new schedule may be a schedule that provides a short debind time. The new schedule may be a schedule that provides a high debind rate. The new schedule may be a schedule that provides an optimal debind time. The new schedule may be a schedule that provides an optimal debind rate.

The retort may be housed in a housing. The reactor may be disposed exterior to the housing. The reactor may be disposed within the housing.

The apparatus may include a channel that is configured to conduct the carrier gas and the hydrocarbon from the retort to the reactor. The channel may be elongated. The channel may be an orifice. It may be that along the channel no vessel configured to oxidize hydrocarbon in a reaction having a temperature greater than 750° C. is included. It may be that along the channel, a vessel configured to oxidize hydrocarbon in a reaction having a temperature greater than 750° C. is included.

The channel may include a fixture that is configured to receive oxygen-bearing gas from a dispenser.

The retort may be in fluid communication with a mixing vessel. The hydrocarbon and carrier gas may be fed into the mixing vessel. The mixing vessel may receiving the oxygen-bearing gas. The mixing vessel may include one or more of pipe, tubing, a valve, a chamber, and any other suitable vessel. The mixing vessel may be configured to induce turbulence in one or more of the hydrocarbon and carrier gas and the oxygen-bearing gas. The mixing vessel may include structures to provide a tortuous path for one or both of the hydrocarbon and carrier gas and the oxygen-bearing gas. The mixing vessel may have a length sufficient for mixing the hydrocarbon and carrier gas with the oxygen-bearing gas, even in the absence of a tortuous path.

The reactor may include an "oxi-cat" catalytic trap. The trap may provide two reactions based on catalysis and heat: (1) oxidation of carbon monoxide to carbon dioxide: and (2) exothermic oxidation (combustion) of hydrocarbons to carbon dioxide and water, in a lean (excess air beyond stoichiometric amount) gas mix. Different catalytic traps may be used, including a metal or ceramic substrate and platinum group metal catalyst particles (e.g. platinum, palladium, rhodium or mixtures of these), and any other suitable catalytic trap. The catalytic trap may include a catalytic converter.

The hydrocarbon and carrier gas may enter the reactor at an entry temperature at or above 200° C. The entry temperature may depend on a path length between the retort and the reactor. At temperatures below 200° C., a catalyst trap will fail to "light off", (the reactions will not occur). To provide sufficient heat for light off, extra heat may be added to the hydrocarbon and carrier gas, or to a component of the reactor itself.

When the carrier gas is inert, the carrier gas and hydrocarbon may have insufficient oxygen for the combustion of the hydrocarbon. An air stream or other source of oxygen may be added to the exhaust stream before it enters the reactor. The carrier gas may include flammable gas to increase the combustion of hydrocarbon in the reactor.

The inert gas may be nonflammable. The inert gas may be non-combustible. The inert gas may be non-combustible at temperatures of the reaction.

The extra heat may be provided by pre-heating the air stream before it is added to the exhaust or before it enters the reactor.

The reactor may include a fixture that is configured to receive oxygen-bearing gas from a dispenser. The fixture may be not part of the channel.

The apparatus may include a control system.

The control system may include a processor. The processor may be configured to receive from a sensor a first value of a characteristic that is responsive to a rate of a reaction in the reactor. The value may include a binary indicator of presence of the characteristic. The binary indicator may correspond to a threshold value. The threshold value may correspond to a limit of detection by a sensor. The value may include a categorical value that indicates a magnitude of the characteristic. The value may include a quantitative value corresponding to the magnitude.

The processor may be configured to determine a variance between the first value and a target. The processor may be configured to transmit to a process control element a reactor input instruction. The reactor input instruction may correspond to a reduction in the variance.

The reactor input instruction may correspond to an increase in the rate.

The reactor input instruction may correspond to a decrease in the rate.

The target may include a target value.

The target may include a target window. The target window may be defined by a lower limit and an upper limit.

When the target is a target value, the variance may include an arithmetic difference between the value of the characteristic and the target value.

When the target is a target window, the variance may include an arithmetic difference between the value of the characteristic and a limit of the target window. When the target is a target window, the variance may include an arithmetic difference between the value of the characteristic and a midpoint of the target window.

The reactor input instruction may correspond to the rate. The correspondence may be based on a stoichiometric relationship between materials that are flowed into the reactor.

The correspondence may be based on kinetic features of materials that are flowed into the reactor. The kinetic features may include concentrations of the materials flowed into the reactor. The kinetic features may include mixing of the materials. The kinetic features may include diffusion rates of the materials.

The correspondence may be based on thermal conditions of the reactor. The thermal conditions may include temperature. The thermal conditions may include heat addition rate. The thermal conditions may include heat removal rate.

A greater reaction rate may be expressed or observed as one or more of an increase in reactor temperature, increase in exothermic heat generation in the reactor, an increased reactor effluent temperature and an increased rate of production of combustion products.

A lesser reaction rate may be expressed or observed as one or more of an decrease in reactor temperature, decrease in exothermic heat generation in the reactor, an decreased reactor effluent temperature and an decreased rate of production of combustion products.

The control system may reduce or eliminate the likelihood that the reaction will take place with insufficient air or too much hydrocarbon and carrier gas. Insufficient air or too much hydrocarbon and carrier gas are conditions that may damage or "poison" the catalyst, and may discharge non-combusted hydrocarbons from the reactor.

The control system may execute a process schedule. The process schedule may include process control variable values that are scheduled for different times during the debinding and sintering of a batch.

Table 7 lists illustrative process control variables for process control elements of the apparatus.

TABLE 7

Illustrative process control variables
for process control elements of the apparatus
Illustrative process control variables for process control elements

| Process control element | Process control variables |
| --- | --- |
| Retort | Interior atmosphere temperature set-point |
| | Interior atmosphere temperature time-derivative |
| | Carrier gas flow rate |
| Furnace (interior to furnace housing and external to the retort) | Temperature set-point |
| | Temperature time-derivative |
| | Coolant flow rate |
| | Coolant cooling-gas flow rate |
| Carrier gas supply line | Pressure |
| | Flow rate |
| Oxygen-bearing gas supply line | Pressure |
| | Temperature |
| | Heating rate |
| | Flow rate |
| Reactor mixing volume | Flow rate |
| Other suitable process control elements | Other suitable control variables |

As used herein, "line" may include a conduit for conveying fluid.

The control system may maintain a pointer that advances in time along the process schedule. The pointer may move along the process schedule in real time during the debinding and sintering. The system may move the pointer to different points along the process schedule to place the apparatus in a state corresponding to the time mark at which the pointer is placed. The system may trigger initiation of a furnace control schedule. The furnace control schedule may be chronologically registered to the process schedule. A position on the furnace control schedule may be invoked based on the position of the pointer. The furnace control schedule may have its own pointer. The furnace control schedule may correspond to a temperature of the furnace at a furnace temperature control location. Table 8 lists illustrative furnace temperature control locations.

TABLE 8

Illustrative furnace temperature control locations.
Illustrative furnace temperature control locations Furnace housing
Furnace insulation
Furnace heat source
Void space between furnace housing and retort wall exterior
Retort wall exterior
Retort wall interior
Retort interior atmosphere
Article platen
Other suitable locations The combustion reaction of hydrocarbons (to carbon dioxide and water) and air/oxygen is exothermic. Heat released by the reaction may increase the temperature of one or more of the hydrocarbon, the carrier gas, the carbon dioxide and the reactor. The control system may control the reaction rate based on one or more of modeling, direct feedback, indirect feedback or any other suitable approach.

One form of direct feedback control is measuring inlet and/or outlet temperatures of the catalyst, and in response, controlling any or all of the following: changing airflow rate to keep the air/fuel ratio lean, changing the furnace temperature ramp rate (faster, slower, stop, reverse direction) effectively adjusting the incoming fuel/air ratio, the application of heat (on/off, change set temperature) to maintain the catalytic trap in an appropriate temperature target window.

Direct feedback control may include providing a characteristic value to a control loop. The control loop may include a proportional-integral-differential ("PID") control algorithm.

To help maintain a lean air/fuel ratio and thus allow for complete or near complete combustion of the hydrocarbons, an oxygen sensor downstream may be used as an estimate of air/fuel ratio and used in the feedback control of a catalytic converter. An LPG (liquefied petroleum gas) sensor may be used downstream of the trap to sense remnant hydrocarbon.

Extent of combustion may be estimated using a carbon dioxide sensor downstream, or a pair of moisture sensors before and after the catalyst, to measure the concentration of products produced.

The input may include a hydrocarbon production rate in a pyrolytic debinding process in the retort.

The input may include a temperature ramp to which the pyrolytic debinding process is subjected. The processor may be configured to adjust a carrier gas flow rate to which the pyrolytic debinding process is subjected.

The input may be a supply rate of oxygen-bearing gas to the reaction.

The input may be a supply rate of sensible heat to the reaction.

Table 9 lists illustrative reactor inputs.

TABLE 9

Illustrative reactor inputs.
Illustrative reactor inputs a hydrocarbon production rate in a pyrolytic debinding process in the retort
a temperature to which the pyrolytic debinding process is subjected
a temperature ramp to which the pyrolytic debinding process is subjected
a carrier gas flow rate to which the pyrolytic debinding process is subjected
a supply rate of oxygen-bearing gas to the reaction.
a supply rate of sensible heat to the reaction.
an electromagnetic field driving the debinding process The sensor may be configured to generate an output based on the presence of a condition. The sensor may be configured to generate an output based on the absence of a condition. The sensor may be configured to generate an output based on a magnitude of a condition.

The sensor may include a temperature sensor.

Table 10 lists illustrative sensors.

TABLE 10

Illustrative sensors.
Illustrative sensors

Thermocouple
Thermistor
Gas phase hydrocarbon sensor
Oxygen sensor
Carrier gas sensor
Particle sensor
Carbon dioxide sensor
Carbon monoxide sensor
Liquefied petroleum gas sensor
Other suitable sensors The apparatus may include a heat source configured to provide heat to the retort. The heat source may provide the heat responsive to a first reactor input instruction. The heat source may include one or more of a resistance heating element, a microwave generator, a combustion heating element, or any other suitable heating element. The apparatus may include a cooling system configured to remove heat from the retort. The cooling system may remove heat from the retort responsive to a second reactor input instruction. The control system may provide the reactor input instructions.

The cooling system may be configured to draw fluid, under vacuum, through insulating material that supports the heat source in thermal communication with the retort.

The cooling system may be configured to move fluid through the furnace. The cooling system may be configured to move the fluid through clearance space between the heat source and a wall of the retort. The wall may be an outer wall of the retort. The cooling system may draw the fluid through the furnace. The cooling system may include a vacuum source to draw the fluid through the furnace. The furnace may include a housing that houses the heat source. The housing may include insulating material. The insulating material may define passageways for the fluid through the insulating material. Tubing may define passageways for the fluid through the insulating material.

The cooling system may include a vacuum source. The vacuum source may draw the fluid through the housing.

The insulating material may support the heat source.

The apparatus may include a filter that is disposed operationally downstream from the furnace heat source and operationally upstream direction from the vacuum source that is configured to draw the fluid away from the heat source.

The insulating material may be friable. Drawing the fluid through the furnace may reduce expulsion of friable material into the atmosphere surrounding the furnace, as compared with forcing the fluid through the insulating material with a positive pressure that may expel the friable material through openings or tolerances in the furnace housing. Drawing the fluid through the furnace may provide a localized flow that may be directed through the filter.

The apparatus may include a heat exchanger that is configured to remove heat from the fluid at a location that is operationally downstream from the furnace heat source and operationally upstream from the filter. The heat exchanger may be configured to provide a cooling gas to receive the heat from the fluid. The fluid may be gaseous. The cooling gas may include air.

The apparatus may include a fixture that is configured to: receive air; and cause blending of the air with the fluid. Upon entering the fixture, the air may have a first temperature that is in the range 18-25° C., at room temperature, at a temperature that is no more than 35° C., or at any other suitable temperature. Upon entering the fixture, the fluid may have a second temperature that is in the range 18-25° C., at room temperature, at room temperature plus a differential, or at any other suitable temperature. The second-temperature differential may be 1, 2, 3, 4, 5, 6, 7, 8, 9, 10, 11, 12, 13, 14, 15° C., or in any range between those values, or any other suitable values or range of values. The fluid and air, after being mixed together, may have a third temperature that is in the range 50-200° C. The third temperature may be in the range 18-25° C., at room temperature, at room temperature plus a differential, or at any other suitable temperature. The third-temperature differential may be 1, 2, 3, 4, 5, 6, 7, 8, 9, 10, 11, 12, 13, 14, 15° C., or in any range between those values, or any other suitable values or range of values. A difference between the third temperature and the first temperature may be no more than 1, 2, 3, 4, 5, 6, 7, 8, 9, 10, 11, 12, 13, 14, 15° C. (third temperature–first temperature), or in any range between those values, or any other suitable values or range of values.

The process controller or another suitable controller may control the rate of supply of the air into the fixture to achieve a desired value of the third temperature. The rate of supply of the air may be based on a PID algorithm or any other suitable control algorithm. Input to the algorithm may include one or more of the first temperature, the second temperature, the third temperature, differences between two of the temperatures, and other suitable temperatures.

The fixture may include a vessel, a duct, a conduit, a tube, an inlet, a baffle, a diffusion head, a valve, mixing valve, or any other suitable fixture.

The apparatus may include a vacuum source that is disposed operationally downstream from the filter, and may be configured to draw the fluid and air from the fixture.

The third temperature may be a temperature that is measured at a location that is operationally downstream from the filter and operationally upstream from the vacuum source.

The algorithm may increase the supply of the air to decrease the third temperature to reduce temperature effects on the vacuum source.

The reactor may include a precious metal substrate that is configured to react the hydrocarbon with oxygen.

The heat source may be configured to raise a temperature of the reactor to greater than 200° C. The heat source may be disposed inside the reactor. The heat source may be configured to transmit heat through a housing of the reactor to an interior of the reactor. The heat source may be configured to heat oxygen-bearing gas outside the reactor. The heat source may be configured to heat operationally upstream from the reactor the carrier gas and the hydrocarbon.

The apparatus may include a heat exchanger. The reactor may include an effluent port. The heat exchanger may be configured to: be in thermal communication with effluent flowing through the effluent port; and remove heat from the effluent. The heat exchanger may be configured to reduce a temperature of the effluent to less than 45° C.

Table 11 lists illustrative maximum temperatures after reduction by the heat exchanger.

TABLE 11

Illustrative maximum temperatures after reduction by the heat exchanger.
Illustrative maximum temperatures (° C.)

20
22
24
26
28
30
32
34
36
38
40
42
44
Other suitable maximum temperatures

The apparatus may include a fixture that is configured to receive air and cause blending of the air with material flowed into the reactor and products of a reaction in the reactor. The fixture may include a vessel, a duct, a conduit, a tube, an inlet, a baffle, a diffusion head, a valve, mixing valve, or any other suitable fixture. The fixture may be a part of the reactor housing. The fixture may be disposed operationally downstream from the reactor in fluid communication with the reactor. The material flowed into the reactor may include the hydrocarbon, the carrier gas, the oxygen-bearing gas, or any other gas flowed into the reactor.

Upon entering the enclosure, the air may have a first temperature that is no more than 35° C., and the material flowed into the reactor and products of a reaction in the reactor may have a second temperature that is no less than 300° C.

The material flowed into the reactor and the products of a reaction in the reactor, after being mixed with the air, may have a third temperature that is in a range such as 180-200° C., 180-190° C. and 190-200° C.

The apparatus may include a filter that is disposed operationally downstream from, and is in fluid communication with, an output port of the reactor. The apparatus may include a vacuum source. The vacuum source may be disposed operationally downstream from the filter. The vacuum source may be configured to draw the material flowed into the reactor and products of a reaction in the reactor, mixed together with the air, through the output port.

The methods may involve the apparatus, and may include a method for combusting hydrocarbon that is emitted from a sintering furnace.

The method may include reacting, in a reaction having a temperature no greater than 750° C., the hydrocarbon with oxygen. The method may include detecting a value of a characteristic that is responsive to a rate of the reaction; and, in response to the value, adjusting an input to the reaction.

The reaction may be a reaction that, in the reactor, at a combustion temperature (see Table 5), does not completely or nearly completely combust the hydrocarbon unless the carrier gas is a flammable mixture.

The reaction may be a reaction that, at a combustion temperature (see Table 5), is not sustainable without catalysis.

The rate may include a rate of production of combustion products.

The target value may be a selected value. The selected value may be derived from a model. The model may be a stochastic combustion model, an analytical combustion model, a numerical combustion model, a combination of the foregoing models or any other suitable model. The target value may be a critical value of values observed during the reaction. The target value may be a critical value of a time derivative derived from values observed during the reaction. A critical value may be a maximum value. A critical value may be a minimum value. The target value may be a constant value. The target value may be a value corresponding to a preselected time. The time may be an elapsed time from initiation of a run. A target window may be defined to bracket one or more of the aforementioned target values.

The reacting may include flowing the hydrocarbon and the oxygen into a catalytic converter.

The value may be a first value. The rate may be a first rate. The first rate may correspond to the first value. The adjusting may move the reaction toward a second rate that corresponds to a second value that is closer to a target than is the first value.

The input may be a hydrocarbon production rate in a pyrolytic debinding process.

The adjusting may include altering a carrier gas flow rate to which the pyrolytic debinding process is subjected.

The adjusting may include altering a temperature ramp to which the pyrolytic debinding process is subjected.

The input may include a supply rate of oxygen-bearing gas to the reaction.

The input may include a supply rate of heat to the reaction.

The adjusting may include altering a heating rate of oxygen-bearing gas that flows into the reaction.

The adjusting may include altering a temperature of oxygen-bearing gas that flows into the reaction.

The adjusting may include altering a flow rate of oxygen-bearing gas that flows into the reaction.

The characteristic may include a temperature.

Table 12 lists illustrative characteristics.

TABLE 12

Illustrative characteristics.
Illustrative characteristics

Temperature
Hydrocarbon gas (threshold)
Hydrocarbon gas (concentration)
Oxygen gas (threshold)
Oxygen gas (concentration)
Carrier gas (threshold)
Carrier gas (concentration)
Carbon monoxide (threshold)
Carbon monoxide (concentration)
Carbon dioxide (threshold)
Carbon dioxide (concentration)
Water vapor (threshold)
Water vapor (concentration)
Aerosol (threshold)
Aerosol (concentration)
Liquefied petroleum gas (threshold)
Liquefied petroleum gas (concentration)
Other suitable characteristics A "threshold" may include an indication of a material's presence. The threshold may be user-determined. The threshold may be defined by a sensor's detection limit or sensitivity. A "concentration" may include a molar concentration, a pressure, a partial pressure, a density or any other suitable measure of concentration.

The characteristic may include a gas compound. The compound may include a species.

The characteristic may include a gas species.
The gas species may be $CO_2$.
The gas species may be CO.
The gas species may be $O_2$.
Table 13 lists illustrative species

TABLE 13

Illustrative species.
Illustrative species $O_2$
$O_3$
$N_2$
$N_xO_y$
$H_2O$
CO
$CO_2$
$H_2$
He
Ar
propane
butane
Methane
Ethane
Other suitable illustrative species The methods may include a method for reacting decomposed binding material. The method may include flowing a carrier gas through a furnace retort; receiving in the carrier gas hydrocarbon released from an article in the retort; and combusting, at a temperature no greater than 750° C., the hydrocarbon.

The methods may include not performing, at a temperature greater than 750° C., operationally downstream of the retort and before the combusting, any transformation of the hydrocarbon. The methods may include condensing a fraction of the hydrocarbon. The fraction may be include relatively higher molecular weight hydrocarbon of the hydrocarbon in the furnace exhaust. The condensing may take place at a temperature less than 750° C. The condensing may be performed operationally downstream of the retort and before the combusting. The methods may include filtering the exhaust to remove the higher molecular weight. The condensing may include the filtering. The filtering may use a filter to nucleate the condensation.

The methods may include preventing an $O_2$ concentration in an interior of the retort from exceeding 100 ppm.

The methods may include, prior to the combusting and operationally downstream from the retort, adding a flammable gas to the carrier gas and hydrocarbon.

The adding may include providing an amount of flammable gas that is no less than the amount that is required for completely combusting the hydrocarbon. The amount may include an amount of $O_2$ that is required for completely combusting flammable gas in the carrier gas.

Table 14 lists illustrative flammable gases

TABLE 14

Illustrative flammable gases.
Illustrative flammable gases
Illustrative Compound Acetylene
Hydrogen
Butane
Ethane
Ethylene
Isobutane
Methane
Oxygen (e.g., $O_2$, $O_3$)

TABLE 14-continued

Illustrative flammable gases.
Illustrative flammable gases
Illustrative Compound Propane
Propylene
Silane
Mixtures of one or more of the above
Any other suitable flammable gas The species may include one or more, or a partial combustion product, of the flammable gases.

The carrier gas may include an inert gas.

The carrier gas may include a noble gas.

The carrier gas may consist essentially of: hydrogen gas and inert gas, wherein the hydrogen concentration is insufficient to provide flammability to the carrier gas when the carrier gas is: in the temperature range 20° C. to 750° C.; at a pressure less than 200 kPa; and mixed with oxygen. The flammability may be a lower flammability limit. The flammability may be a flammability defined in an industrial standard. Table 15 lists illustrative industrial standards.

TABLE 15

Illustrative industrial standards.
Illustrative industrial standards
(hereby incorporated herein in their entireties)

ISO 10156
IEC60079
EN61779
Other suitable industrial standards

The carrier gas may include hydrogen gas and inert gas, wherein the hydrogen concentration is insufficient to provide flammability to the carrier gas when the carrier gas is: in the temperature range 20° C. to 750° C.; at a pressure less than 200 kPa; and mixed with oxygen.

The carrier gas may be a gas that consists essentially of: hydrogen gas; and nitrogen gas; wherein the hydrogen gas has a concentration that is no greater than 5.5 mol-% of the hydrogen and nitrogen gases combined.

The carrier gas may be a gas that consists essentially of: hydrogen gas; and argon gas; wherein the hydrogen gas has a concentration that is no greater than 2.94 mol-% of the hydrogen and argon gases combined.

The carrier gas may be a gas that consists essentially of: hydrogen gas; and helium gas; wherein the hydrogen gas has a concentration that is no greater than 3.9 mol-% of the hydrogen and helium gases combined.

The methods may include methods for treating exhaust from a sintering furnace. The methods may include: using the furnace, applying a furnace control schedule to a first batch of articles, the first batch having a first load value; and, using the furnace, applying the furnace control schedule to a second batch of articles, the second batch having a second load value. Advancement along the furnace control schedule may be triggered by a change in a reaction rate in a catalytic converter that receives exhaust from the furnace. The first batch may have a first resource-consumption efficiency. The second batch may have a second resource-consumption efficiency. The second resource-consumption efficiency may be greater than the first resource-consumption efficiency by a factor that is no more than 1.2. The second load value may be greater than the first load value by a factor in the range 1.2-100.

The furnace control schedule may include a program of retort interior temperature set-points corresponding to different times. The furnaces schedule may include a program of heat fluxes to be applied to the retort at different times.

A batch of articles may include 1, 2, 3, . . . articles.

The first load value may be a binder mass in the first batch. The second load value may be a binder mass in a second batch.

The first resource consumption efficiency may include the ratio $$\frac{\text{(binder mass pyrolyzed from the first batch)}}{\text{(carrier gas mass consumed to debind the first batch)}};$$

and the second resource consumption efficiency may include the ratio $$\frac{\text{(binder mass pyrolyzed from the second batch)}}{\text{(carrier gas mass consumed to debind the second batch)}}.$$

The first resource consumption efficiency may include the ratio $$\frac{\text{(binder mass pyrolyzed from the first batch)}}{\text{(oxygen gas mass consumed to debind the first batch)}};$$

and the second resource consumption efficiency may include the ratio $$\frac{\text{(binder mass pyrolyzed from the second batch)}}{\text{(oxygen gas mass consumed to debind second batch)}}.$$

The first resource consumption efficiency may include the ratio $$\frac{\text{(binder mass pyrolyzed from the first batch)}}{\text{(heat supplied to a retort interior for debinding of the first batch)}};$$

and the second resource consumption efficiency may include the ratio $$\frac{\text{(binder mass pyrolyzed from the second batch)}}{\text{(heat supplied to the retort interior for debinding of the second batch)}}.$$

Table 16 lists illustrative loads whose values may be used in the numerator of the efficiency ratios.

TABLE 16

Illustrative loads.
Illustrative load

Batch binder mass
Batch volume
Batch surface area
Batch aggregate mass (article(s) + binder)
Ratio of batch article mass to batch binder mass
One or more, or a combination of, quantitative batch information items The load may be selected to correspond to a brown part (before debinding), a brown part (after debinding), or a net change (such as brown part batch volume minus brown part batch volume). A load value may be any suitable metric that is associated with the load. The metric may be proportional to the load. The metric may be derived from the load.

Table 17 lists illustrative quantities that may be used in the numerator of the efficiency ratios.

TABLE 17

Illustrative quantities.
Illustrative quantities

Carrier gas mass consumed to debind a batch
Oxygen gas mass consumed to debind a batch
Heat supplied to a retort interior for debinding of a batch
Electrical power supplied to furnace for debinding of a batch
Other suitable quantities One or both of the loads and the quantities may be normalized to a normalization factor.

Table 18 lists illustrative normalization factors.

TABLE 18

Illustrative normalization factors.

Retort reynolds number (pre-debind)
Retort reynolds number (post-debind)
A retort temperature during debind
A retort temperature ramp during debind
A load listed in Table 16
A quantity listed in Table 17
Other suitable quantities The apparatus and methods may combust furnace exhaust hydrocarbon to create clean effluent that meets environmental health and safety requirements. The apparatus and methods may reduce debinding cycle time. The apparatus and methods may reduce gas consumed per cycle based on the detected amount of a combustion product. The apparatus and methods may increase time between maintenance events. The apparatus and methods may reduce the need for cleaning or replacing filters or pipes to mitigate against flow restrictions or clogs from the build up of combustion products, unreacted materials, or their residues. The apparatus and methods may capture furnace exhaust heat. The apparatus and methods may use the furnace exhaust heat to perform useful work. The apparatus and methods may be employed in a heating system that produces hydrocarbons, such as an ashing furnace, a heat treating oven, a thermal catalytic debind oven, a vacuum debinding apparatus and the like.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows illustrative arrangement 100 for processing articles. Arrangement 100 may include furnace 102. Arrangement 100 may include reactor 104.

Arrangement 100 may include process control system 105. Furnace 102 may include retort 106. Workpieces W may be placed in interior 108 of retort 106. Workpieces W may include a batch of one or more articles. The articles may include brown parts. Furnace 102 may include heat source 110. Heat source 110 may be disposed in insulating material 112. Heat source 110 may include resistance heating elements.

Furnace 102 may receive carrier gas 114. Carrier gas 114 may be contained in dispenser 116. Dispenser 116 may be in fluid communication with interior 108 via supply line 118. Valve 120 may control the rate of flow of carrier gas 114 into interior 108. Furnace 102 may heat interior 108 to a temperature at which binder in workpieces W is decomposed. The decomposed binder may include hydrocarbon. Interior 108 may release furnace exhaust through line 117. The exhaust may include the hydrocarbon and carrier gas 114.

Furnace 102 may include cooling system 122. Cooling system 122 may include conduits 124 for flowing coolant through furnace 102. Conduits 124 may include tubes. Conduits 124 may be conduits that do not include tubes. Conduits 124 may be passageways formed in insulating material 112. Insulating material 112 may define the walls of conduits 124. The coolant may be provided from a coolant source (not shown). The coolant source may include a coolant reservoir. The coolant may include air.

Cooling system 122 may include vacuum source 126. Vacuum source 126 may include a blower, a fan, a pump or any other suitable device for applying a negative pressure to conduits 124. Insulating material 112 may be friable. Vacuum source 126 may draw the coolant through filter 128. The coolant may entrain particles in the range 0.3-100μ from insulating material 112. Filter 128 may include one or more filters that are rated, such as a HEPA filter, to collect the particles.

Cooling system 122 may include heat exchanger 186. Heat exchanger 186 may reduce the coolant temperature to a temperature that is appropriate for flow through filter 128. Heat exchanger 186 may use air to cool the coolant.

Reactor 104 may be in communication with furnace 102 via lines 117 and 144. Reactor 104 may include catalytic converter 130. Catalytic converter 130 may support a reaction that combusts the hydrocarbon. The reaction may consume oxygen. Dispenser 132 may provide oxygen-bearing gas 134 to catalytic converter 130. Valve 136 may limit the flow of oxygen-bearing gas 134 to catalytic converter 130. Line 138 may provide fluid communication between dispenser 132 and valve 136. Mixing vessel 140 may be present at junction 142. The pressure in line 117 may be sufficient to drive oxygen-bearing gas 134 toward reactor 104. Mixing vessel 140 may mix oxygen-bearing gas 134 with the hydrocarbon and carrier gas 114 exhausted from retort 106.

Catalytic converter 130 may require heat to reach a minimum temperature for combustion. Arrangement 100 may include heat exchanger 146. Heat exchanger 146 may include a heat source. Heat exchanger 146 may provide heat generated by a heat source external to heat exchanger 146. Heat exchanger 146 may provide the heat required for the minimum temperature. Heat exchanger 146 may be in line 138. Heat exchanger 146 may provide the heat to oxygen-bearing gas 134.

Line 144 may provide fluid communication from junction 142 to catalytic converter 130. Reactor 104 may include output port 147. Line 148 may receive effluent from catalytic converter 130 via output port 147. Line 148 may include heat exchanger 150. Heat exchanger 150 may include a cooling source. Heat exchanger 150 may provide coolant cooled by a cooling source external to heat exchanger 150. Heat exchanger 150 may remove heat from the effluent. Line 148 may include outlet 152. Outlet 152 may release the effluent to the surrounding atmosphere.

Process control system 105 may include user device 107. User device 107 may include a monitor, a mobile device, or any other suitable user interface device. System 105 may include processor 109. System 105 may include communication transceiver 111. Transceiver 111 may provide electronic communication between system 105 and other elements of arrangement 100. The communication may be performed wirelessly (by radio frequency, light, or other signals, e.g.), via wire, or a combination of both.

Arrangement 100 may include one or more of illustrative sensor points 154, 156, 158, 160, 162, 164, 166, 168, 180, 182, and 184, which may be deployed or arranged as shown or described herein. One or more of the sensor points may include one or more of the sensors listed in Table 10. One or more of the sensors at the sensor points may be in electronic communication with process control system 105.

Arrangement 100 may include one or more illustrative flow rate sensors. The flow rate sensors may include mass flow meters. The flow rate sensors may include illustrative sensors 170, 172, 174, 176 and 178. One or more of the flow rate sensors may be in electronic communication with process control system 105.

Arrangement 100 may include one or more control points. The control points may include mechanical, electrical or radio-frequency components that control the flow of energy or mass through arrangement 100. A control point may be used to increase a flow. The control point may be used to decrease a flow. The control points may include local component controllers. The component controllers may adjust performance of the components in response to communication from process control and monitoring system 105.

The control points may include one or more valves, such as valves 120 and 136.

The control points may include one or more of heat source 110, heat exchanger 146 and heat exchanger 150. The control points may include vacuum source 126.

Figure 2:
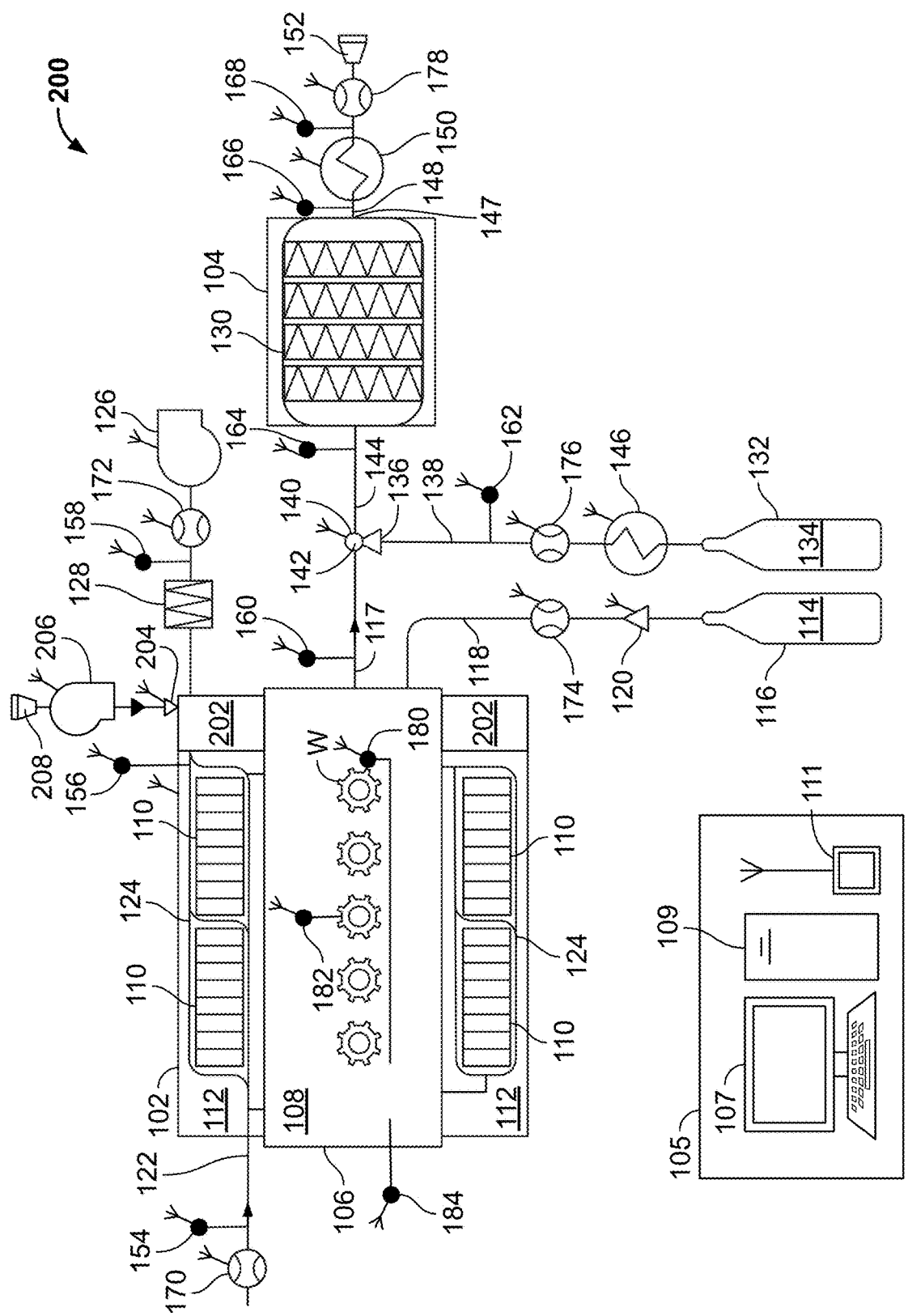
FIG. 2 shows further illustrative apparatus in accordance with principles of the invention.

FIG. 2 shows illustrative arrangement 200. In arrangement 200, cooling system 122 includes fixture 202. Fixture 202 may receive air or a suitable cooling gas. Fixture 202 may receive the air or suitable cooling gas through valve 204. Vacuum source 126 may draw the air through valve 204. The air may enter valve 204 through inlet 208. In fixture 202, the air may mix with the coolant, and cool the coolant to a temperature that is appropriate for flow through filter 128. Fixture 202 may include an interior volume in which the air and coolant may mix. Fixture 202 may be contiguous with furnace 102. Fixture 202 may be spaced apart from furnace 202. When fixture 202 is spaced apart from furnace 102, fixture 202 may be in fluid communication with conduit 124 via a fluid communication line (not shown). A furnace such as furnace 102 may include a fixture such as fixture 202. The fixture may be within a housing of the furnace.

The control points may include valve 204.

Figure 3:
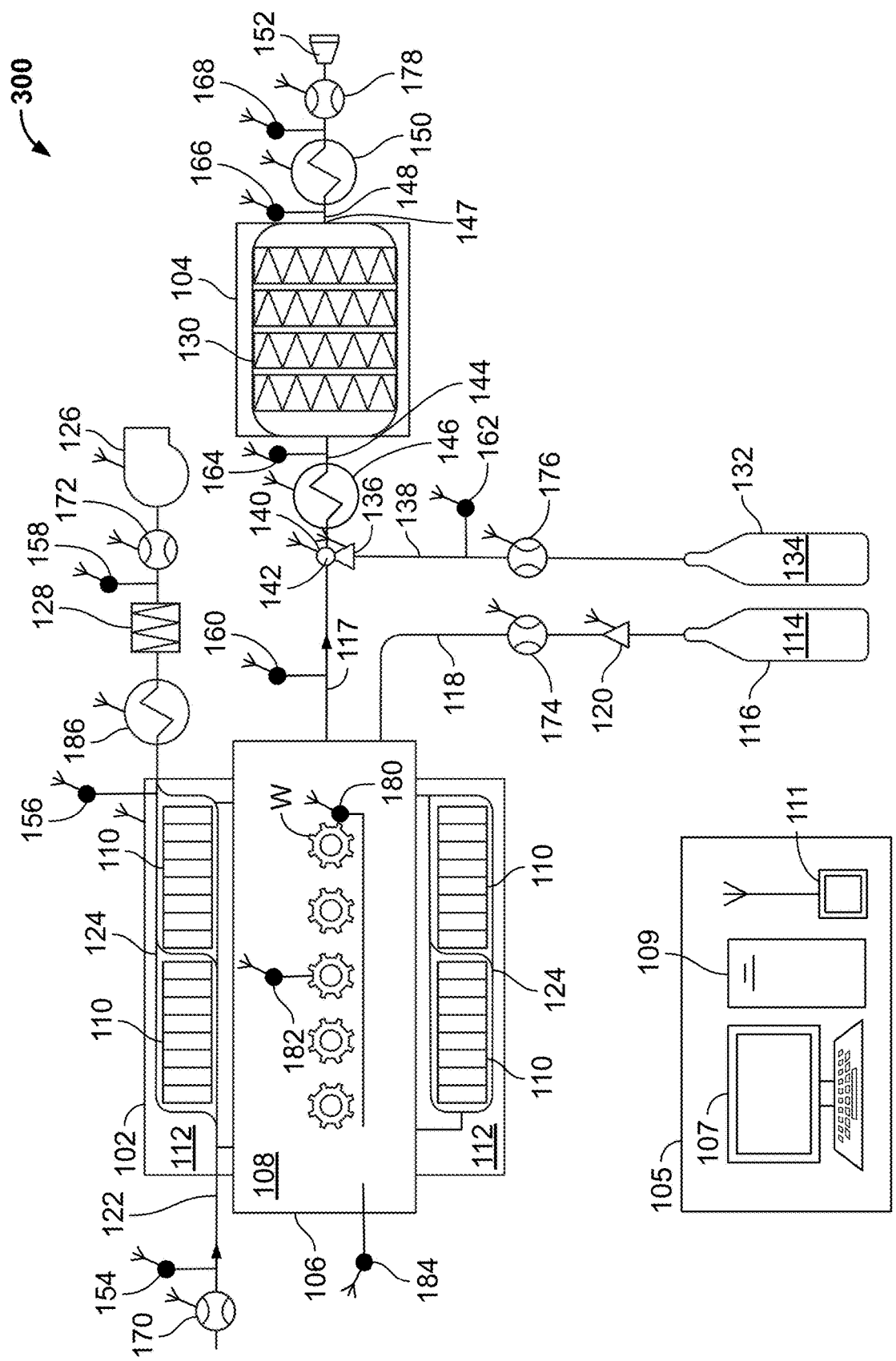
FIG. 3 shows still further illustrative apparatus in accordance with principles of the invention.

FIG. 3 shows illustrative arrangement 300. Arrangement 300 may have one or more features in common with one or both of arrangements 100 (shown in FIG. 1) and 200 (shown in FIG. 2). In arrangement 300, heat exchanger 146 is disposed on line 144. Heat exchanger 146 is downstream from valve 136. Heat exchanger 146 is upstream from reactor 104. Heat exchanger 146 may provide heat to a mixture of the hydrocarbon, carrier gas 114 and oxygen-bearing gas 134.

Figure 4:
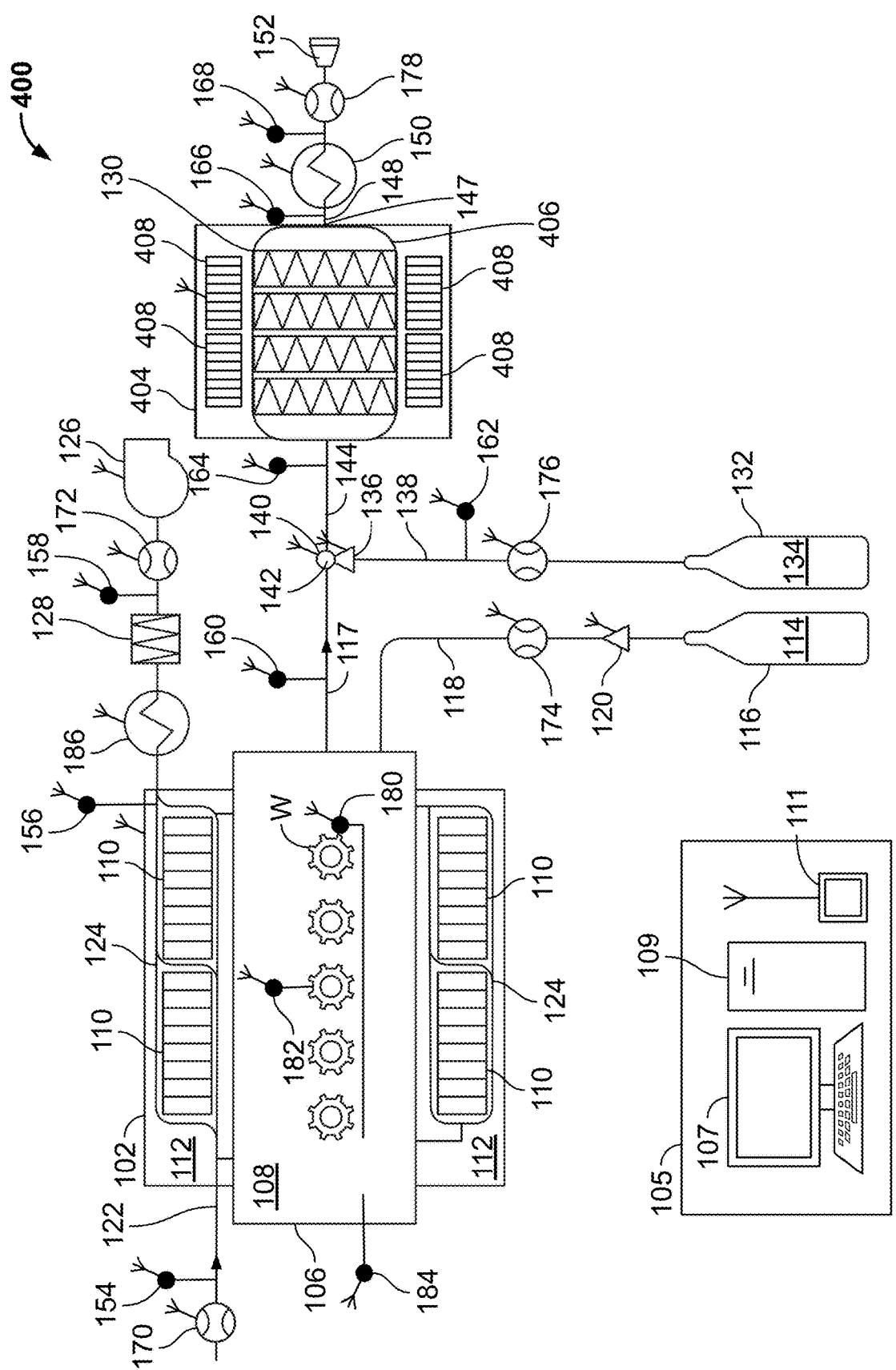
FIG. 4 shows yet further illustrative apparatus in accordance with principles of the invention.

FIG. 4 shows illustrative arrangement 400. Arrangement 400 may have one or more features in common with one or more of arrangements 100 (shown in FIG. 1), 200 (shown in FIG. 2) and 300 (shown in FIG. 3). Arrangement 400 may include reactor 404. Reactor 404 may include catalytic converter 406. Reactor 404 may include heat source 408. Heat source 408 may include a heat exchanger. Heat source 408 may provide heat to catalytic converter 406. The heat may increase the temperature of catalytic converter 406.

Figure 5:
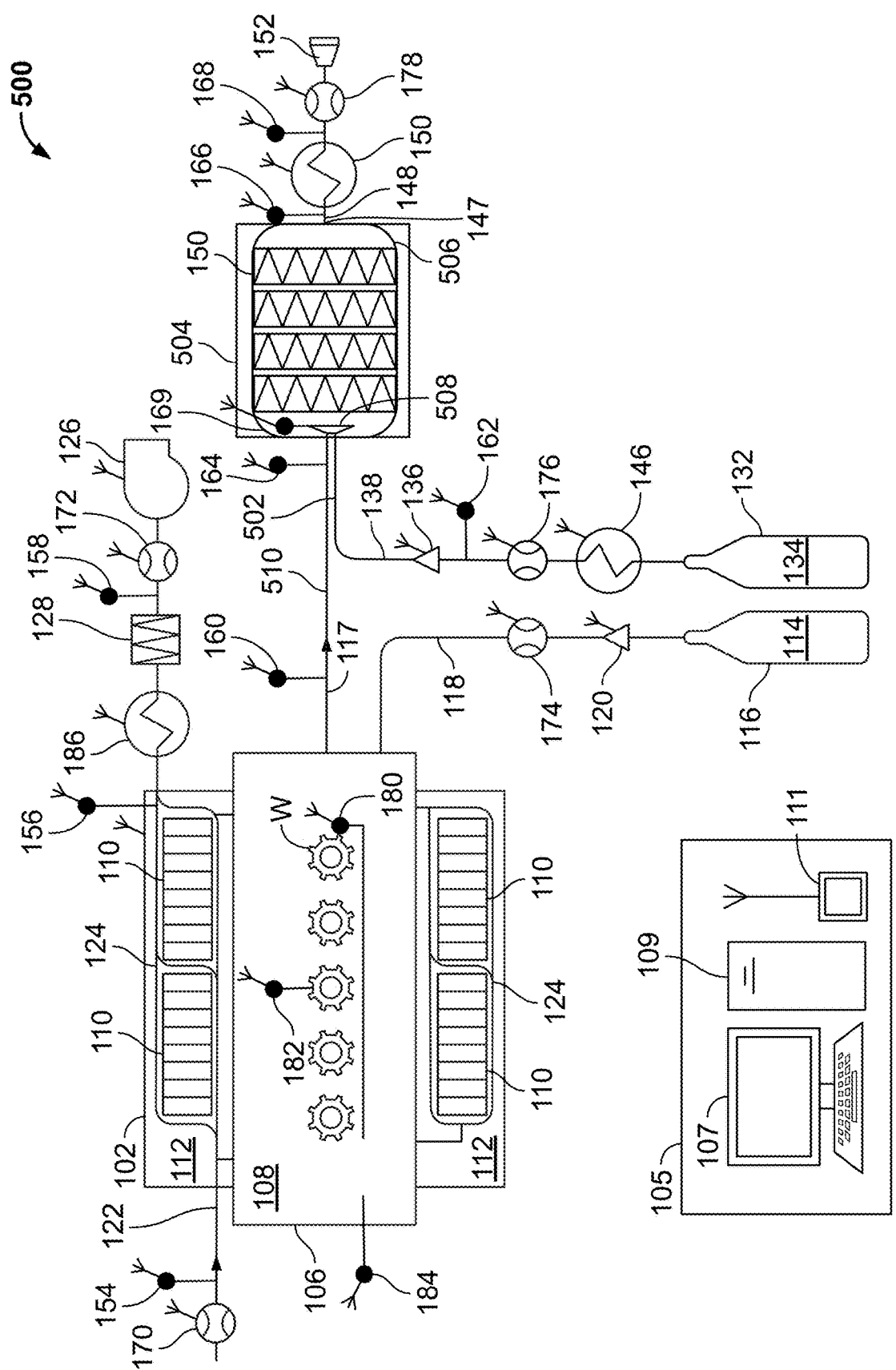
FIG. 5 shows yet further apparatus in accordance with principles of the invention.

FIG. 5 shows illustrative arrangement 500. Arrangement 500 may have one or more features in common with one or more of arrangements 100 (shown in FIG. 1), 200 (shown in FIG. 2), 300 (shown in FIG. 3) and 400 (shown in FIG. 4). Arrangement 500 may include reactor 504. Reactor 504 may include catalytic converter 506. Catalytic converter 506 may include adjustable mixing head 508. Adjustable mixing head 508 may receive furnace exhaust from furnace 102 via line 510. Adjustable mixing head 508 may receive oxygen-bearing gas 134 from line 502. Line 502 may receive the oxygen-bearing gas from line 138. Adjustable mixing head 508 may mix oxygen-bearing gas 134 with the furnace exhaust prior to reaction of oxygen with the hydrocarbon in catalytic converter 506.

Arrangement 500 may include sensor point 169, which may be deployed or arranged as shown or described herein. Sensor point 169 may include one or more of the sensors listed in Table 10. One or more of the sensors at the sensor points may be in electronic communication with process control system 105.

Figure 6:
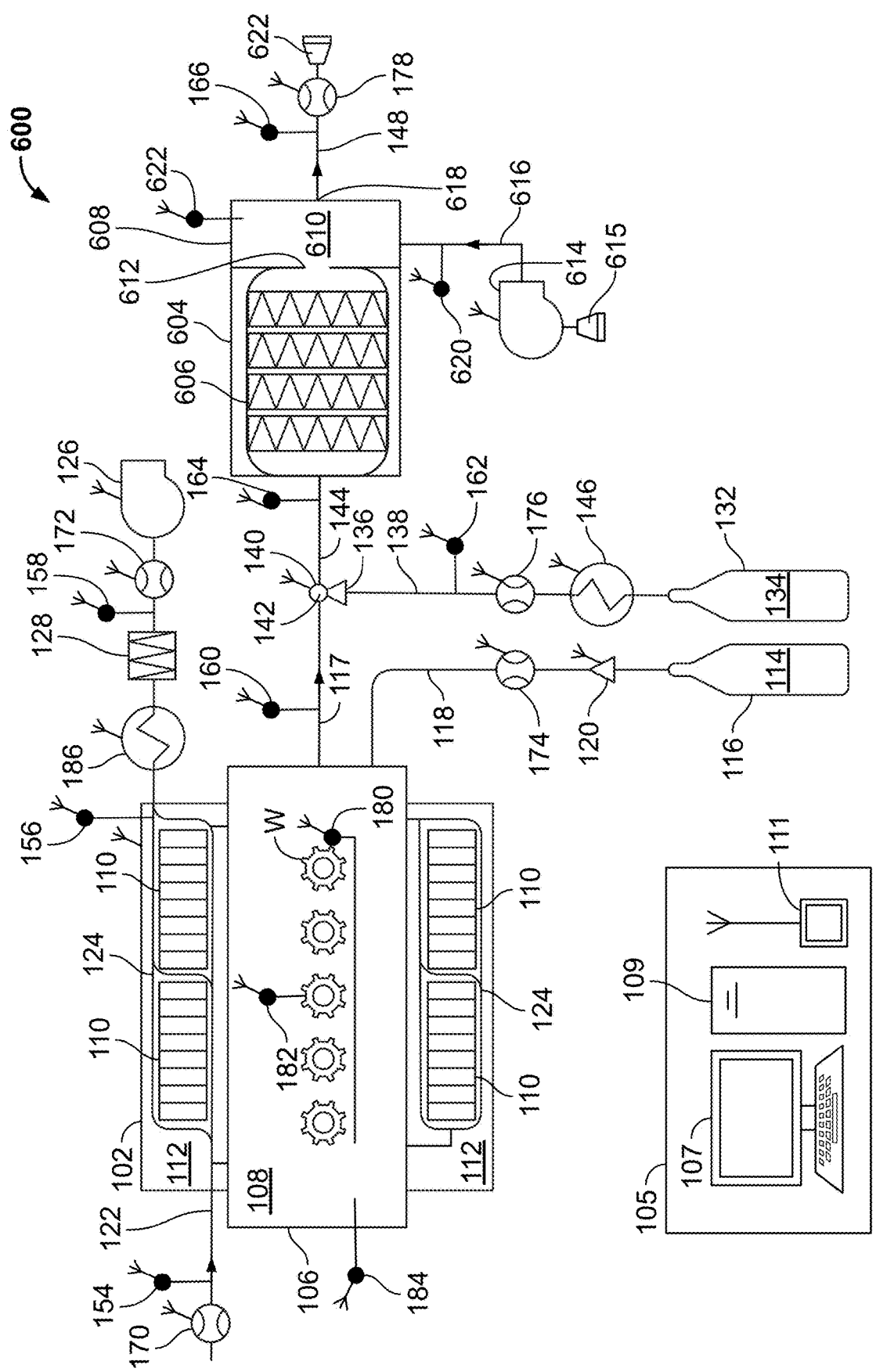
FIG. 6 shows yet further apparatus in accordance with principles of the invention.

FIG. 6 shows illustrative arrangement 600. Arrangement 600 may have one or more features in common with one or more of arrangements 100 (shown in FIG. 1), 200 (shown in FIG. 2), 300 (shown in FIG. 3), 400 (shown in FIG. 4) and 500 (shown in FIG. 5). Arrangement 600 may include reactor 604. Reactor 604 may include catalytic converter 606. Reactor 604 may include fixture 608. Fixture 608 may enclose mixing volume 610. Material flowed into reactor 604 and products of a reaction in the reactor may flow from catalytic converter 606 through passageway 612 into mixing volume 610. Pressure source 614 may receive a cooling fluid through inlet 615. Pressure source 614 may blow the cooling fluid through line 616 into volume 610. Pressure source 614 may include a blower, a fan, a pump or any other suitable device for applying a positive pressure to line 616.

The cooling fluid may include air or any other suitable cooling fluid. Fixture 608 may include output port 618. Fixture 608 may be in fluid communication with line 148 via output port 618.

Arrangement 600 may include one or more of sensor points 620 and 622, which may be deployed or arranged as shown or described herein. One or more of sensor points 620 and 622 may include one or more of the sensors listed in Table 10. One or more of the sensors at the sensor points may be in electronic communication with process control system 105.

Processes in accordance with the principles of the invention may involve one or more features of the apparatus and methods shown in FIGS. 1-6 and described herein. For the sake of illustration, the steps of the illustrated processes will be described as being performed by a "system." The "system" may include one or more of the features of the apparatus that are shown in FIGS. 1-6 and/or any other suitable device or approach.

Figure 7:
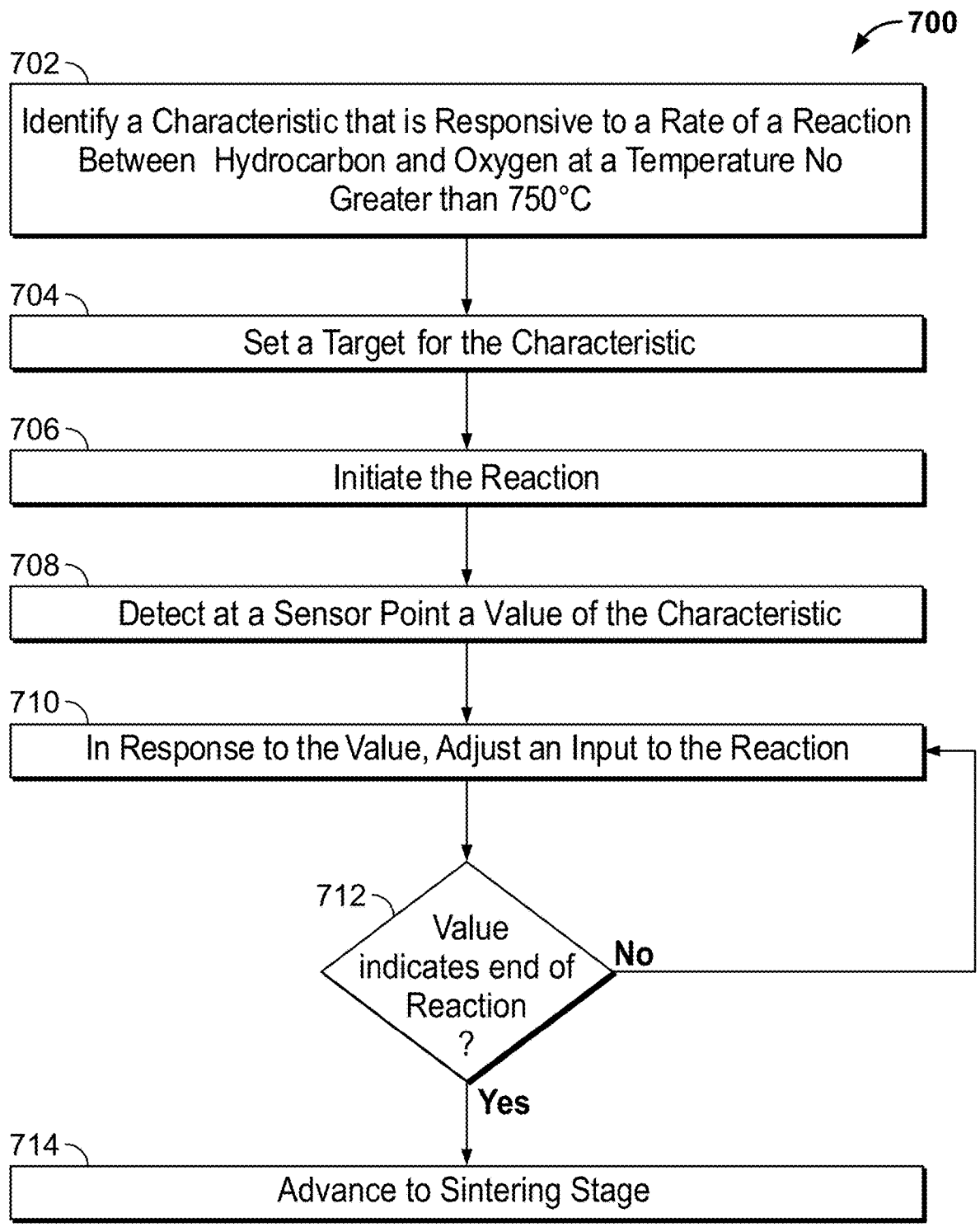
FIG. 7 shows illustrative steps of a method in accordance with principles of the invention.

FIG. 7 shows illustrative method 700 for combusting hydrocarbon that is emitted from a sintering furnace. At step 702, the system may identify a characteristic that is responsive to a rate of a reaction between hydrocarbon and oxygen at a temperature no greater than 750° C. The system may receive the characteristic from a user. The system may retrieve the characteristic from machine readable memory.

At step 704, the system may set a target value for the characteristic. At step 706, the system may initiate the reaction. At step 708, the system may detect at a sensor point a value of the characteristic. At step 710, the system may adjust an input to the reaction in response to the value. If at step 712 the value does not indicate that the reaction has ended, method 700 may continue at step 708. If at step 712, the value indicates that the reaction has ended, the system may proceed to step 714. At step 714, the system may advance a pointer to the sintering stage. The system may sense the end of the reaction by a change in a value of a characteristic that is different from the characteristic of step 712.

Figure 8:
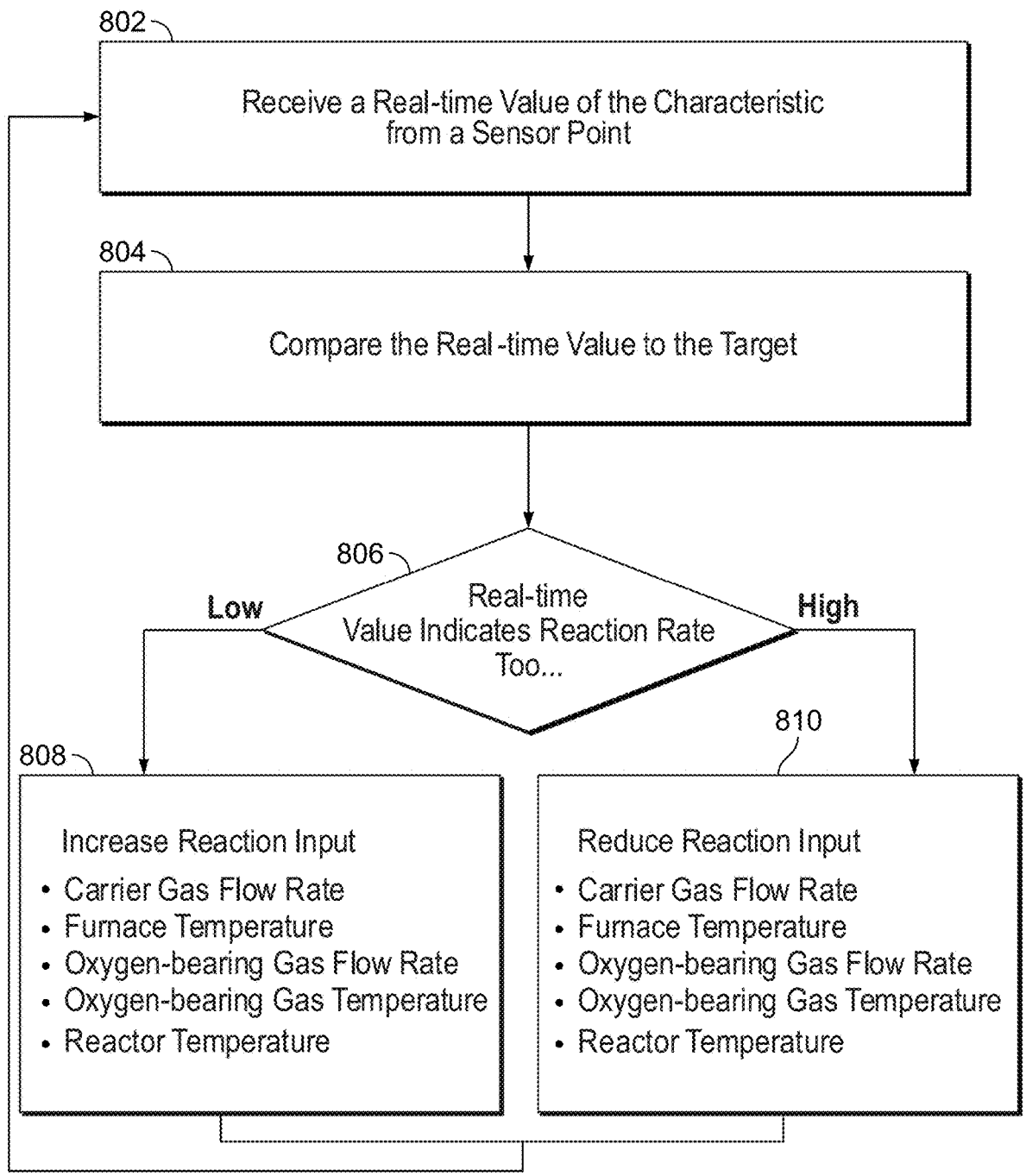
FIG. 8 shows further illustrative steps of a method in accordance with principles of the invention.

FIG. 8 shows illustrative method 800. One or more of the steps of method 800 may be executed in connection with step 710 of method 700 (shown in FIG. 7).

At step 802, the system may receive a real-time sensed value of the characteristic from a sensor disposed at a sensor point. At step 804, the system may compare the real-time value to the target value. The comparison may include inputting the value into a PID controller loop.

At step 806, the system may determine whether the reaction rate is too low or too high. Step 806 may be included in the control loop algorithm.

If at step 806, it is determined that the reaction rate is too low, the method may proceed to step 808. At step 808, the system may increase a reaction input.

If at step 806, it is determined that the reaction rate is too high, the method may proceed to step 810. At step 810, the system may reduce a reaction input. After executing either of steps 808 or 810, the method may return to step 802.

Figure 9:
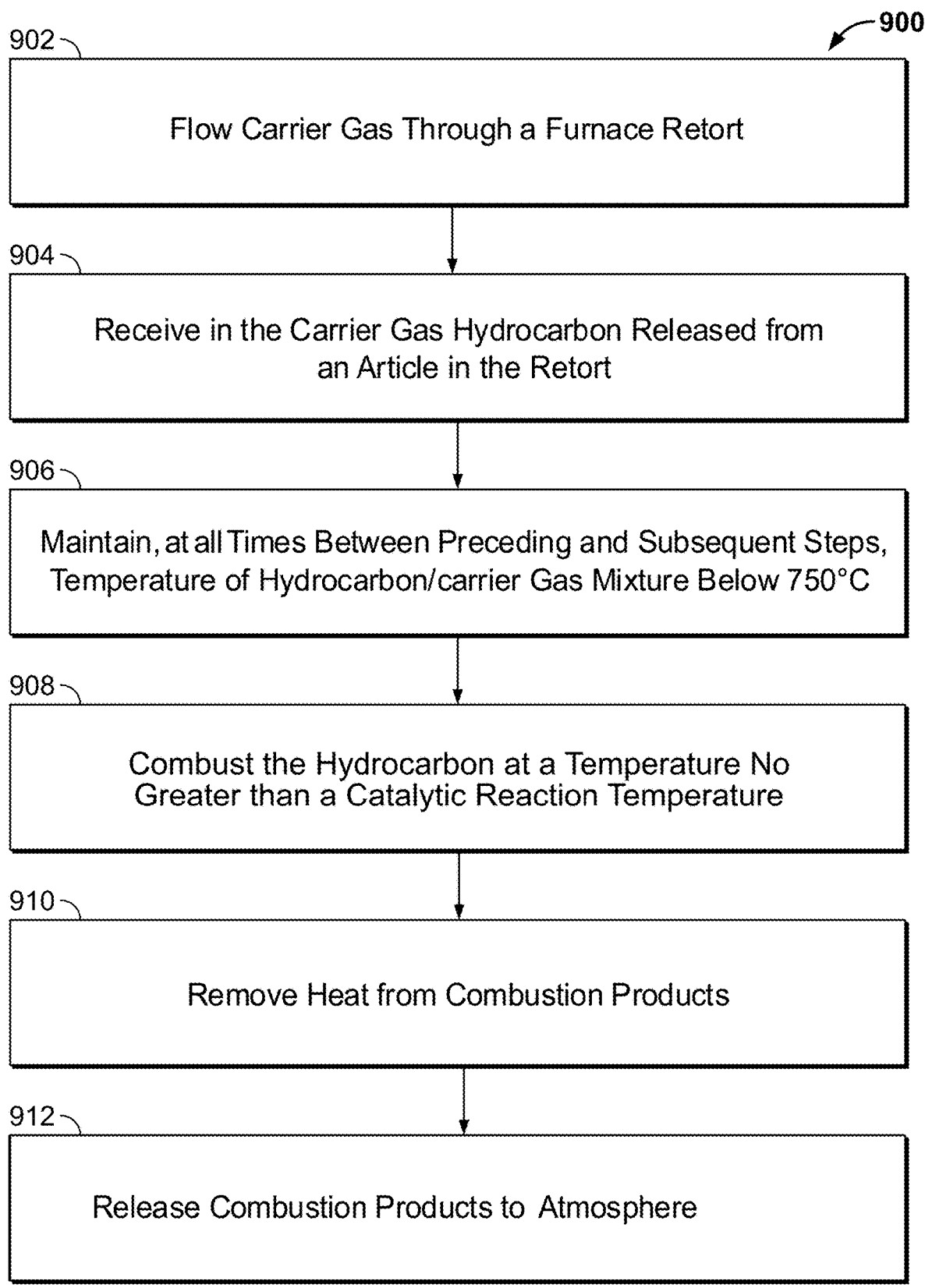
FIG. 9 shows still further illustrative steps of a method in accordance with principles of the invention.

FIG. 9 shows illustrative method 900 for reacting decomposed binding material. At step 902, the system may cause the apparatus to flow carrier gas through a furnace retort. At step 904, the carrier gas may receive hydrocarbon released from an article in the retort. Step 906 accounts for the interval between step 904 and step 908. At step 906, the hydrocarbon and carrier gas may be maintained at all times at a temperature below 950° C. At step 908, the system may cause the apparatus to combust the hydrocarbon at a temperature no greater than a catalytic reaction temperature. The catalytic reaction temperature may be as high as 900° C. The catalytic reaction temperature may be one of the upper limits of the ranges listed in Table 6. At step 910, the system may cause the apparatus to remove heat from the combustion products formed in step 908. At step 912, the apparatus may release the combustion products to an atmosphere. The atmosphere may be an indoor atmosphere. The atmosphere may be an outdoor atmosphere.

Figure 10:
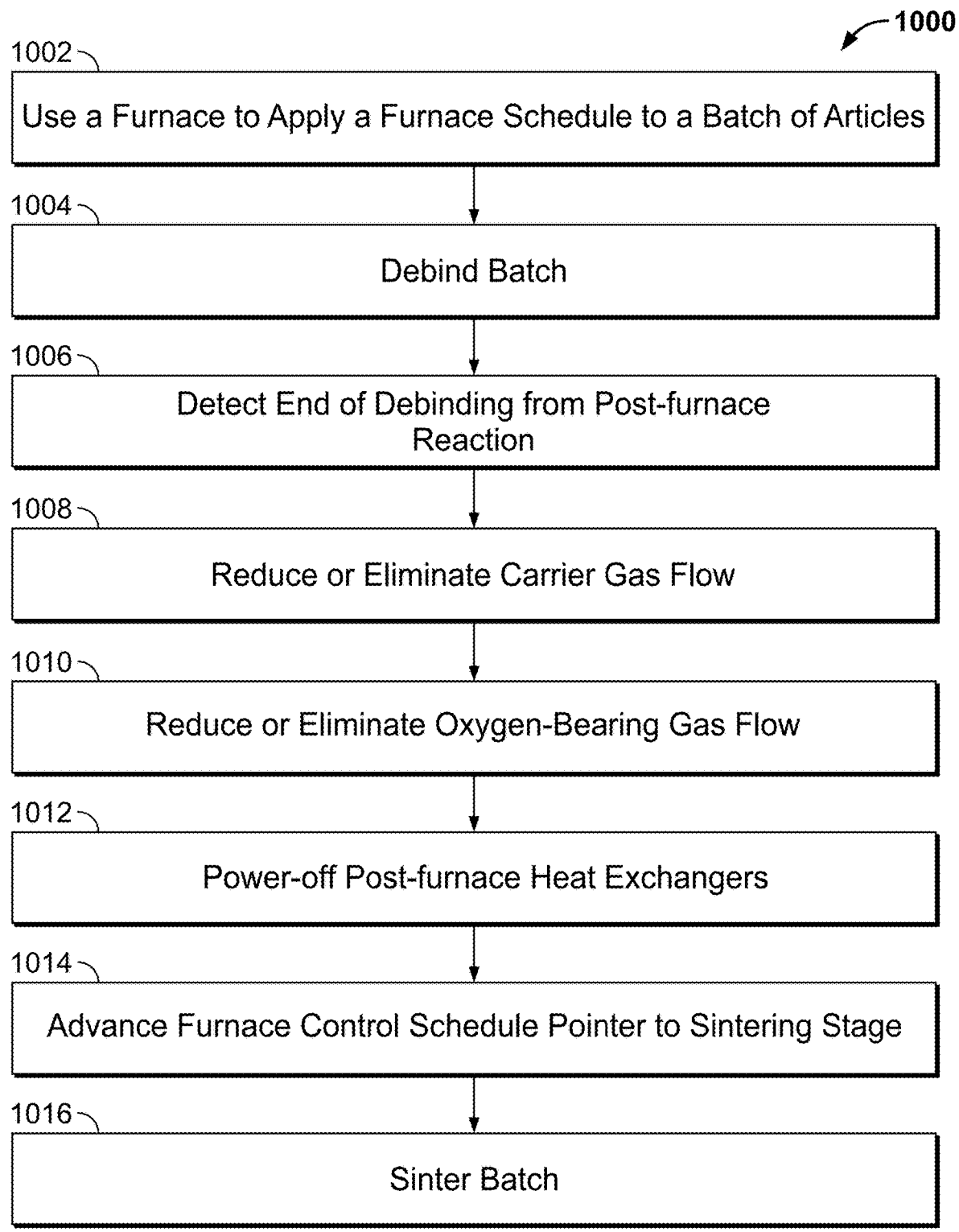
FIG. 10 shows yet further illustrative steps of a method in accordance with principles of the invention.

FIG. 10 shows illustrative method 1000 for treating exhaust from a sintering furnace while reducing consumption of debinding resources. At step 1002 the system may cause the furnace to apply a furnace control schedule to a batch of articles. At step 1004, the furnace may debind the batch. At step 1006, the system may detect the end of the debinding using sensors deployed at the reactor. At step 1008, the system may reduce or eliminate carrier gas flow. At step 1010, the system may reduce or eliminate oxygen-bearing gas flow. At step 1012, the system may power-off post-furnace heat exchangers. At step 1014, the system may advance a furnace control schedule pointer to a sintering stage. At step 1016, the furnace may sinter the batch.

Figure 11:
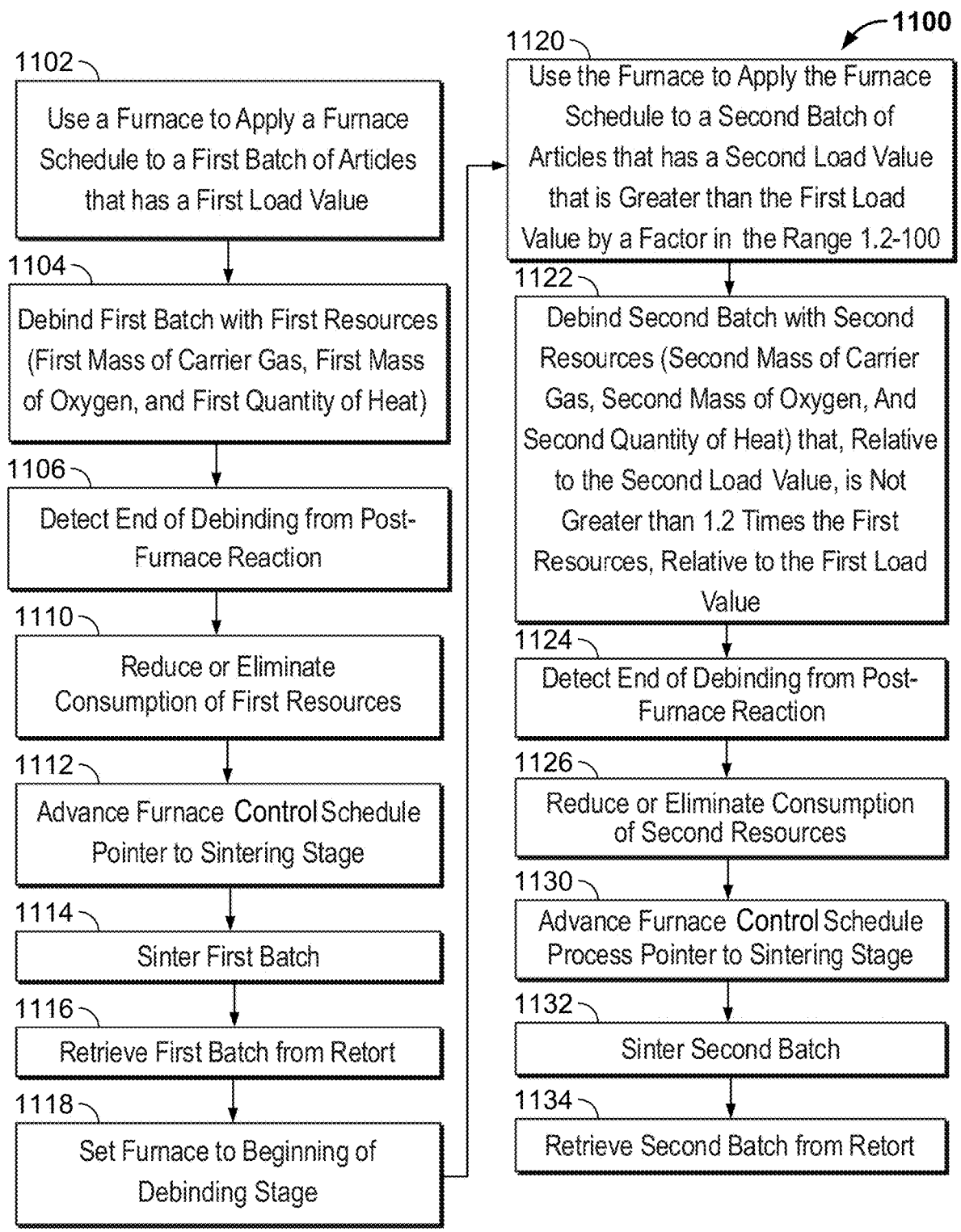
FIG. 11 shows yet further illustrative steps of a method in accordance with principles of the invention.

FIG. 11 shows illustrative method 1100 for efficiently treating exhaust from a sintering furnace. At step 1102, the system may cause the furnace to apply a furnace control schedule to a first batch of articles that has a first load value. At step 1104, the furnace may debind the first batch using first resources, such as a first mass of carrier gas, a first mass of oxygen, and a first quantity of heat. The heat may be the net heat exchanged in any one or the sum of any selected heat exchangers, including coolers, in the apparatus. At step 1106, the system may detect the end of debinding from a sensor disposed at the post-furnace reaction. At step 1110, the system may reduce or eliminate consumption of first resources. At step 1112, the system may advance a furnace control schedule pointer to a sintering stage. At step 1114, the furnace may sinter the first batch. At step 1116, a user or device may retrieve the first batch from the retort. At step 1118, the system may reset the pointer to the beginning of a debinding stage.

At step 1120, the system may cause the furnace to apply the same furnace control schedule to a second batch of articles that has a second load value that is greater than the first load value by a factor in the range 1.3-110. At step 1122, the furnace may debind the second batch using second resources. When normalized to their respective load values, the second resources do not exceed the first resources by more than a factor of 1.3.

At step 1124, the system may detect the end of debinding from a sensor disposed at the post-furnace reaction. At step 1126, the system may reduce or eliminate consumption of second resources. At step 1130, the system may advance a furnace control schedule pointer to a sintering stage. At step 1132, the furnace may sinter the second batch. At step 1134, a user or device may retrieve the second batch from the retort.

Figure 12:
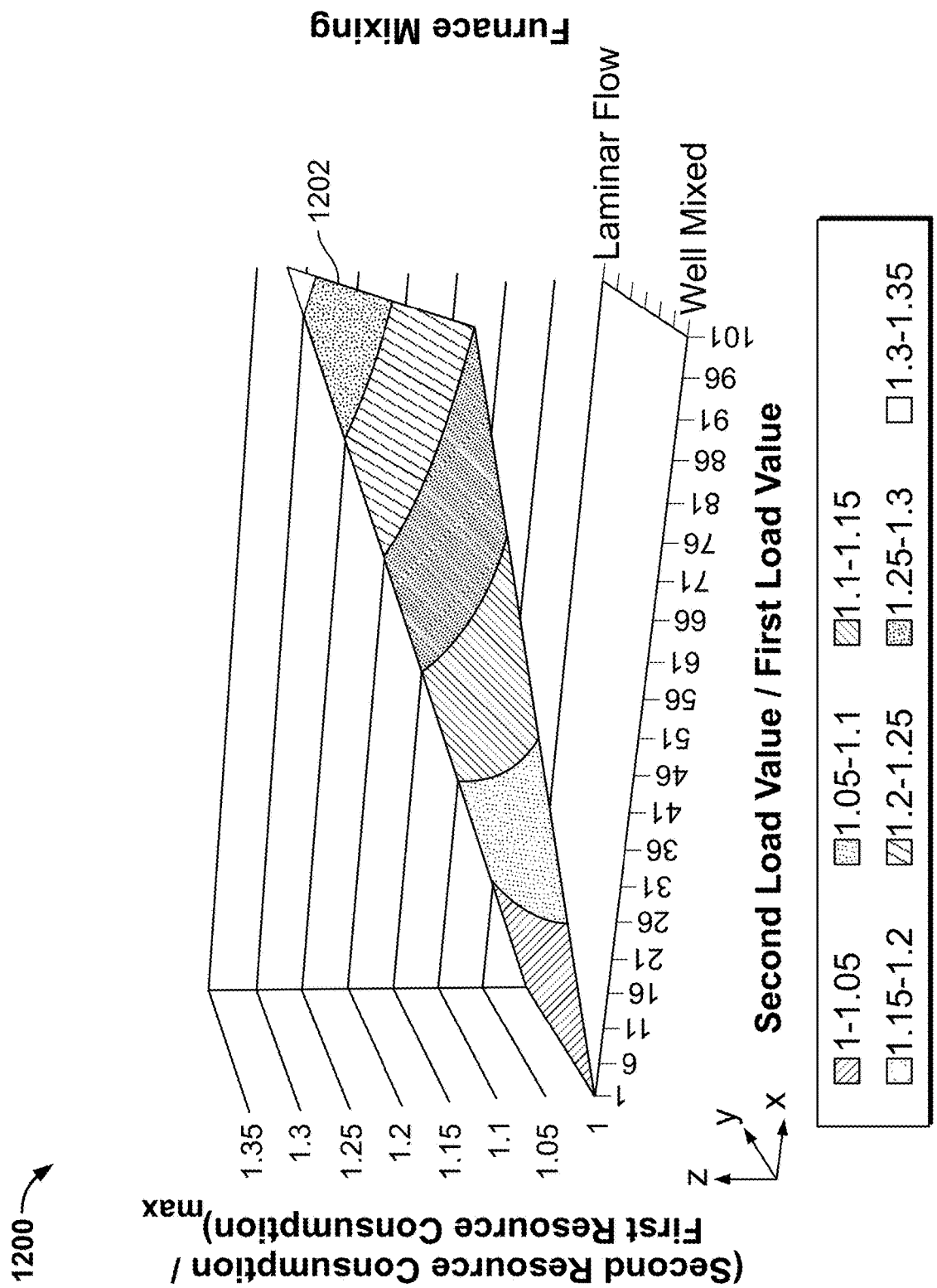
FIG. 12 shows an illustrative parameterization of a process in accordance with principles of the invention.

FIG. 12 shows illustrative efficiency stability information 1200. Information 1200 includes surface 1202. Surface 1202 illustrates the relative efficiencies achieved in processing the two batches identified in method 1100 (shown in FIG. 11). The x-axis corresponds to the relative increase in load value between the first batch and the second batch. The y-axis corresponds to the turbulence of carrier gas in the retort. The z-axis shows hypothetical relative efficiencies of debinding the two different batches. Even when the relative load value is near 120, the second resource consumption does not exceed the first resource consumption by more than a factor of 1.45. The increase in resource consumption is more pronounced when retort flow is laminar, and less pronounced when the retort flow is well-mixed. The resource consumption ratios, therefore, may be further normalized to respective indices of turbulence, such as a Reynolds number.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 13:
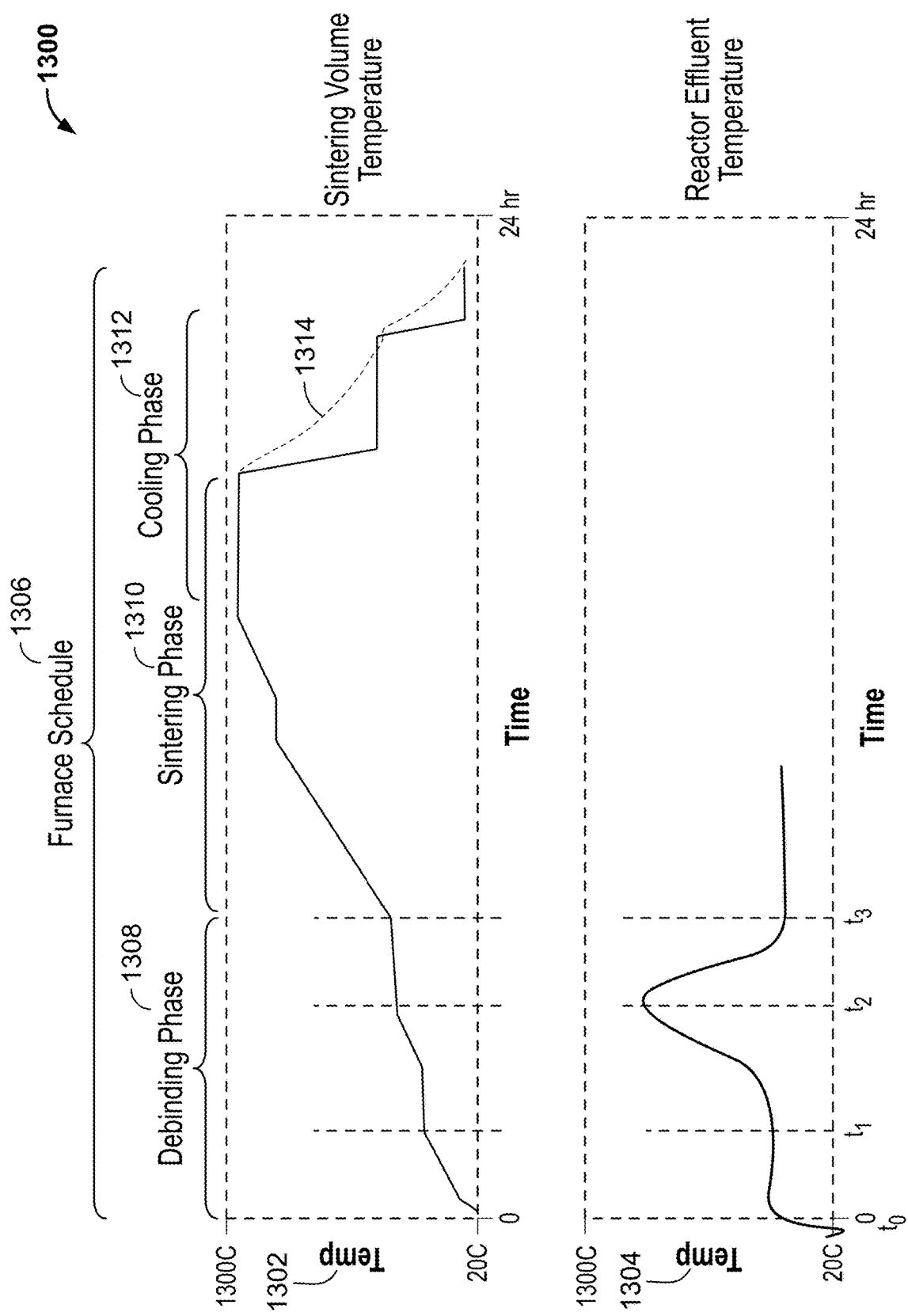
FIG. 13 shows illustrative information derived from apparatus and methods in accordance with principles of the invention.

FIG. 13 shows experimental data plots 1300. Data plots 1300 include temperature time-series 1302 and temperature time-series 1304 for furnace control schedule 1306. Furnace control schedule 126 included debind phase 1308, sintering phase 1310, and cooling phase 1312. Temperature time-series 1302 corresponds to a furnace control schedule. Temperature time-series 1304 corresponds to a temperature measured in effluent of a reactor. At time t0, the retort temperature was ramped up, and the reactor was heated to light-off temperature. At time $t_1$, the furnace is bringing the batch up to debind temperature, and the reactor temperature remains near light-off temperature. At time $t_2$, the furnace has ramped up to a higher debind temperature, and the reactor has reached a peak temperature. At time $t_3$, the reactor temperature cools, because debinding is complete, and the furnace control schedule pointer is advanced to sintering phase 1310. After sintering phase 1310, the furnace is cooled to cool the batch. Curve 1314 is the batch temperature. The batch temperature may be a measured temperature of the atmosphere interior the retort. The batch temperature may be a measured temperature of a platen upon which the batch rests. The batch temperature may be a measured temperature of an article.

Figure 14:
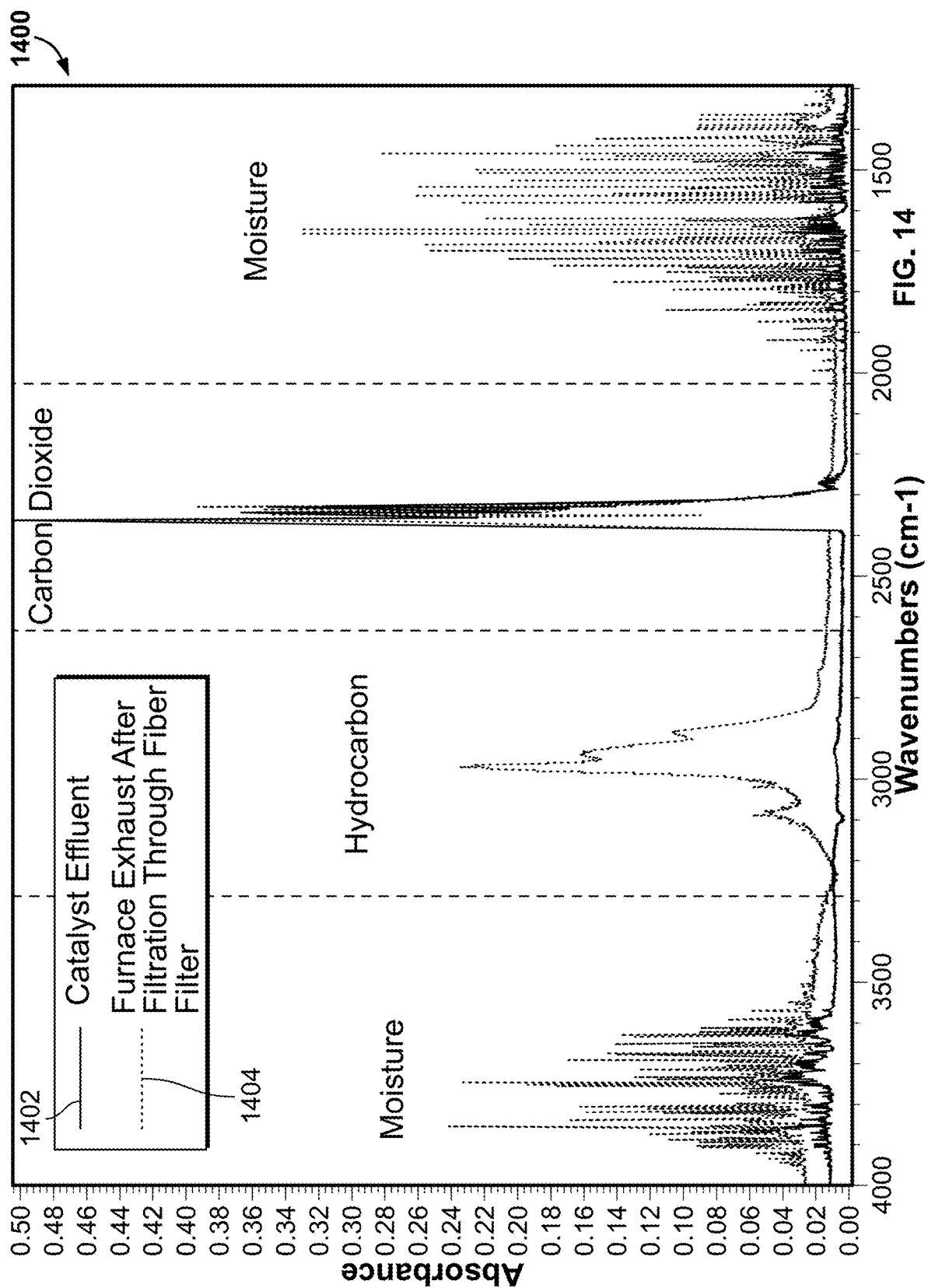
FIG. 14 shows further illustrative information derived from apparatus and methods in accordance with principles of the invention.

FIG. 14 shows experimental data plots 1400 which provide a comparison between the effluent from a reactor shown and described herein and the exhaust of a sintering furnace after filtration through a conventional fiber filter. The plots show optical absorbance spectra (Fourier Transform Infrared) for the effluent (1402) and the filtered exhaust (1404).

Plots 1400 show that there is little to no detectable hydrocarbon content at peak debind ($t_2$, in FIG. 13). There are also no detectable amounts of carbon monoxide (3150 cm$^{-1}$), which, if present, would have indicated incomplete reaction.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for providing catalytic thermal debind furnaces with feedback control are provided. Persons skilled in the art will appreciate that the present invention can be practiced by other than the described embodiments, which are presented for purposes of illustration rather than of limitation, and that the present invention is limited only by the claims that follow.

What is claimed is:

1. Apparatus for processing an article, the apparatus comprising:
   a furnace retort configured to:
      exclude ambient air; and
      receive a carrier gas, said carrier gas consisting of a gas selected from an inert gas, a noble gas, and hydrogen gas; and
   a reactor comprising an "oxi-cat" catalytic trap that is configured to:
      receive, at an entry temperature at or above 200° C., from the retort the carrier gas and hydrocarbon pyrolyzed in the retort;
      combust, at a temperature no greater than 750° C., the hydrocarbon; and
   a control system that comprises a processor that is configured to:
      receive from a sensor a first value of a characteristic that is responsive to a rate of a reaction in the reactor; and
      determine a variance between the first value and a target;
   transmit to a process control element a reactor input instruction corresponding to a reduction in the variance based on a stoichiometric relationship between the carrier gas and the hydrocarbon, wherein the processor is configured to adjust a carrier gas flow rate to which the pyrolytic debinding process is subjected.

2. The apparatus of claim 1 further comprising a channel configured to conduct the carrier gas and the hydrocarbon from the retort to the reactor; wherein, along the channel, no vessel configured to oxidize hydrocarbon in a reaction having a temperature greater than 750° C. is included.

3. The apparatus of claim 1 further comprising a channel configured to conduct the carrier gas and the hydrocarbon from the retort to the reactor, the channel including a fixture configured to receive oxygen-bearing gas from a dispenser.

4. The apparatus of claim 1 further comprising a channel configured to conduct the carrier gas and the hydrocarbon from the retort to the reactor.

5. The apparatus of claim 4 wherein:
   the reactor includes a fixture configured to receive oxygen-bearing gas from a dispenser; and
   the fixture is not part of the channel.

6. The apparatus of claim 1, wherein the input is a hydrocarbon production rate in a pyrolytic debinding process in the retort.

7. The apparatus of claim 6 wherein the processor is configured to adjust a temperature ramp to which the pyrolytic debinding process is subjected.

8. The apparatus of claim 1, wherein the input is a supply rate of oxygen-bearing gas to the reaction.

* * * * *